United States Patent
Choi et al.

(10) Patent No.: US 10,784,971 B2
(45) Date of Patent: Sep. 22, 2020

(54) METHOD OF SCHEDULING FOR UNDERWATER WIRELESS MOBILE NETWORK

(71) Applicant: Korea Institute of Ocean Science & Technology, Busan (KR)

(72) Inventors: Young Chol Choi, Daejeon (KR); A Ra Cho, Daejeon (KR); Yong Kon Lim, Daejeon (KR)

(73) Assignee: Korea Institute of Ocean Science Technology, Busan (KR)

( * ) Notice: Subject to any disclaimer, the term of this patent is extended or adjusted under 35 U.S.C. 154(b) by 232 days.

(21) Appl. No.: 16/072,643

(22) PCT Filed: Jan. 25, 2018

(86) PCT No.: PCT/KR2018/001142
§ 371 (c)(1),
(2) Date: Jul. 25, 2018

(87) PCT Pub. No.: WO2018/139886
PCT Pub. Date: Aug. 2, 2018

(65) Prior Publication Data
US 2020/0244375 A1 Jul. 30, 2020

(30) Foreign Application Priority Data

Jan. 25, 2017 (KR) .......................... 10-2017-0011915
Apr. 11, 2017 (KR) .......................... 10-2017-0046773
Dec. 15, 2017 (KR) .......................... 10-2017-0173414

(51) Int. Cl.
*G01V 1/38* (2006.01)
*G01S 1/72* (2006.01)
(Continued)

(52) U.S. Cl.
CPC .......... *H04B 13/02* (2013.01); *H04W 40/244* (2013.01); *H04W 72/005* (2013.01)

(58) Field of Classification Search
None
See application file for complete search history.

(56) References Cited

U.S. PATENT DOCUMENTS 5,119,341 A * 6/1992 Youngberg ........... G01S 5/0009
367/5
7,283,815 B2 * 10/2007 Kim .................... H04W 56/009
455/423

(Continued)

FOREIGN PATENT DOCUMENTS

KR         101522279 B1     6/2015

*Primary Examiner* — Tuan A Tran
(74) *Attorney, Agent, or Firm* — Harness, Dickey & Pierce, P.L.C.

(57) ABSTRACT

The present invention relates to a method of scheduling for an underwater wireless mobile network. Particularly, the present invention relates to a method of scheduling for an underwater wireless mobile network, whereby the method may consider a scheduling method that does not cause collision at a specific time domain, and improve network efficiency by receiving in a sink node a packet in a packet train form in consideration with a transfer velocity of a sound wave and a packet length rather than performing orthogonalization to avoid transmission time overlap at a specific time.

20 Claims, 19 Drawing Sheets

(51) Int. Cl.
*H04B 13/02*    (2006.01)
*H04W 72/00*    (2009.01)
*H04W 40/24*    (2009.01)

(56) References Cited

U.S. PATENT DOCUMENTS

| | | | | |
|---|---|---|---|---|
| 7,319,411 | B2* | 1/2008 | Ong | G08C 19/04 |
| | | | | 340/870.11 |
| 7,417,923 | B2* | 8/2008 | Greelish | G01S 5/30 |
| | | | | 367/129 |
| 7,796,466 | B2* | 9/2010 | Combee | G01V 1/22 |
| | | | | 367/15 |
| 7,872,947 | B2* | 1/2011 | An | H04B 11/00 |
| | | | | 367/134 |
| 8,964,773 | B2* | 2/2015 | Brown, III | H04L 45/10 |
| | | | | 370/432 |
| 9,100,317 | B1* | 8/2015 | Xia | G01S 5/18 |
| 9,170,319 | B2* | 10/2015 | Gosling | G01S 5/0009 |
| 9,297,919 | B2* | 3/2016 | L'Her | G01V 1/38 |
| 9,411,063 | B2* | 8/2016 | L'Her | G01S 11/14 |
| 9,641,262 | B2* | 5/2017 | Crowell | H04B 11/00 |
| 9,648,651 | B2* | 5/2017 | Edge | H04L 65/1016 |
| 10,139,488 | B2* | 11/2018 | Hama | G01S 15/86 |
| 10,284,305 | B2* | 5/2019 | Crowell | H04B 11/00 |
| 2008/0279047 | A1* | 11/2008 | An | H04B 11/00 |
| | | | | 367/134 |
| 2013/0159554 | A1* | 6/2013 | Kim | H04W 56/0055 |
| | | | | 709/248 |
| 2015/0124565 | A1* | 5/2015 | Gosling | G01S 5/0009 |
| | | | | 367/127 |
| 2017/0019187 | A1* | 1/2017 | Newborough | G01S 1/72 |

* cited by examiner

[FIG 1]
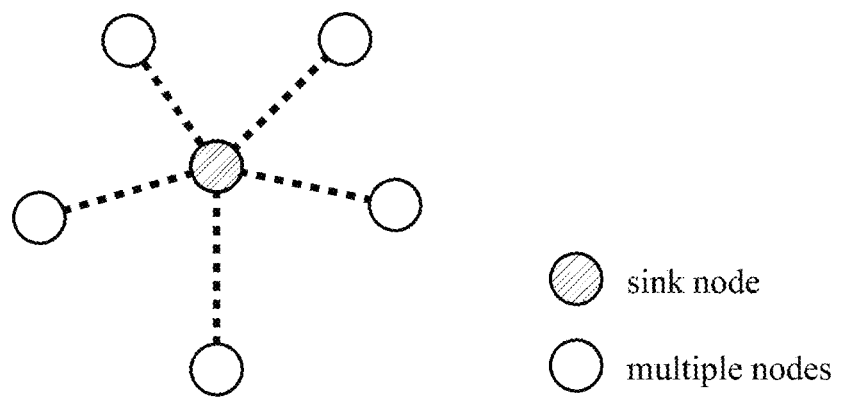

[FIG 2A]
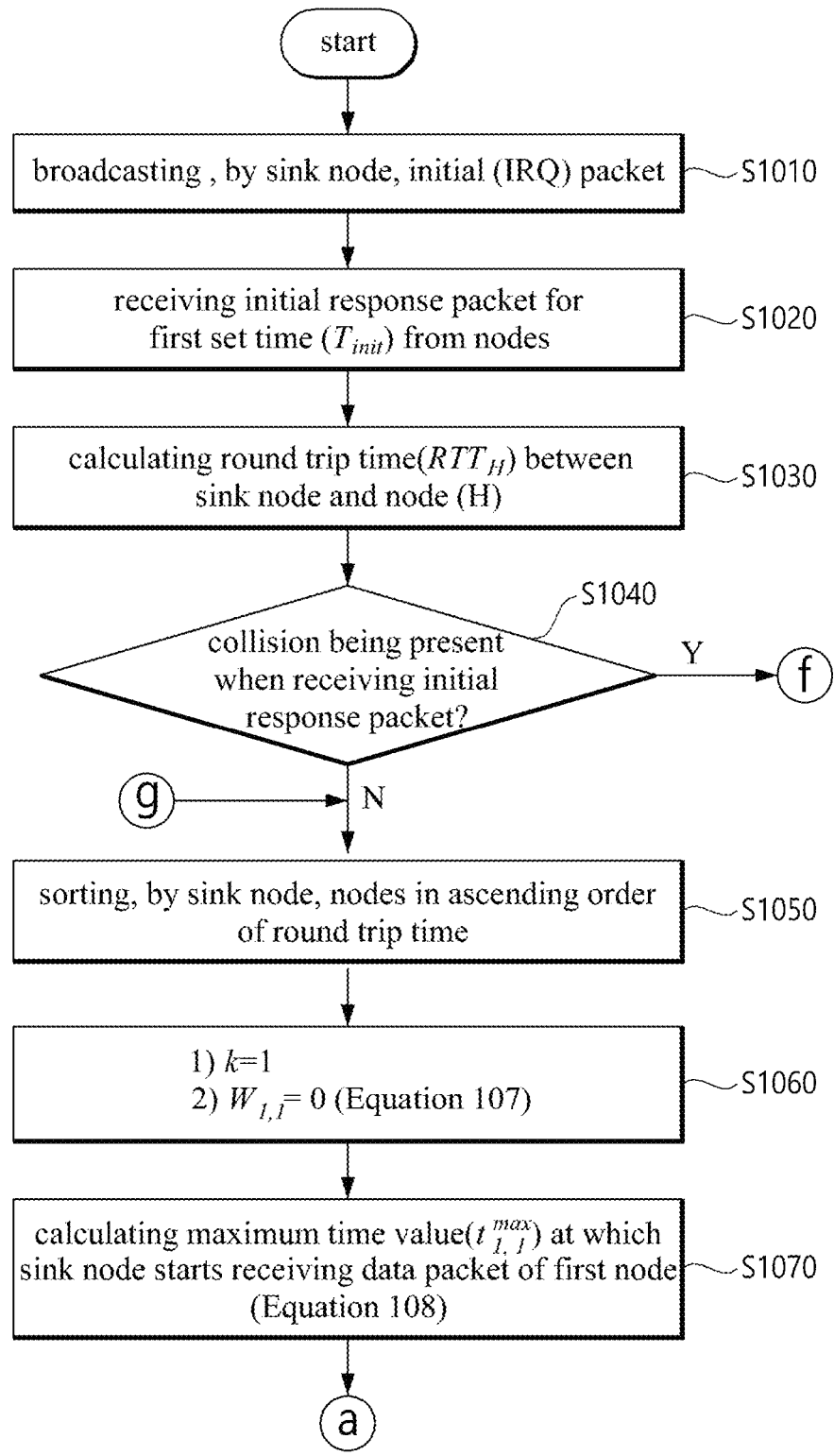

[FIG 2B]
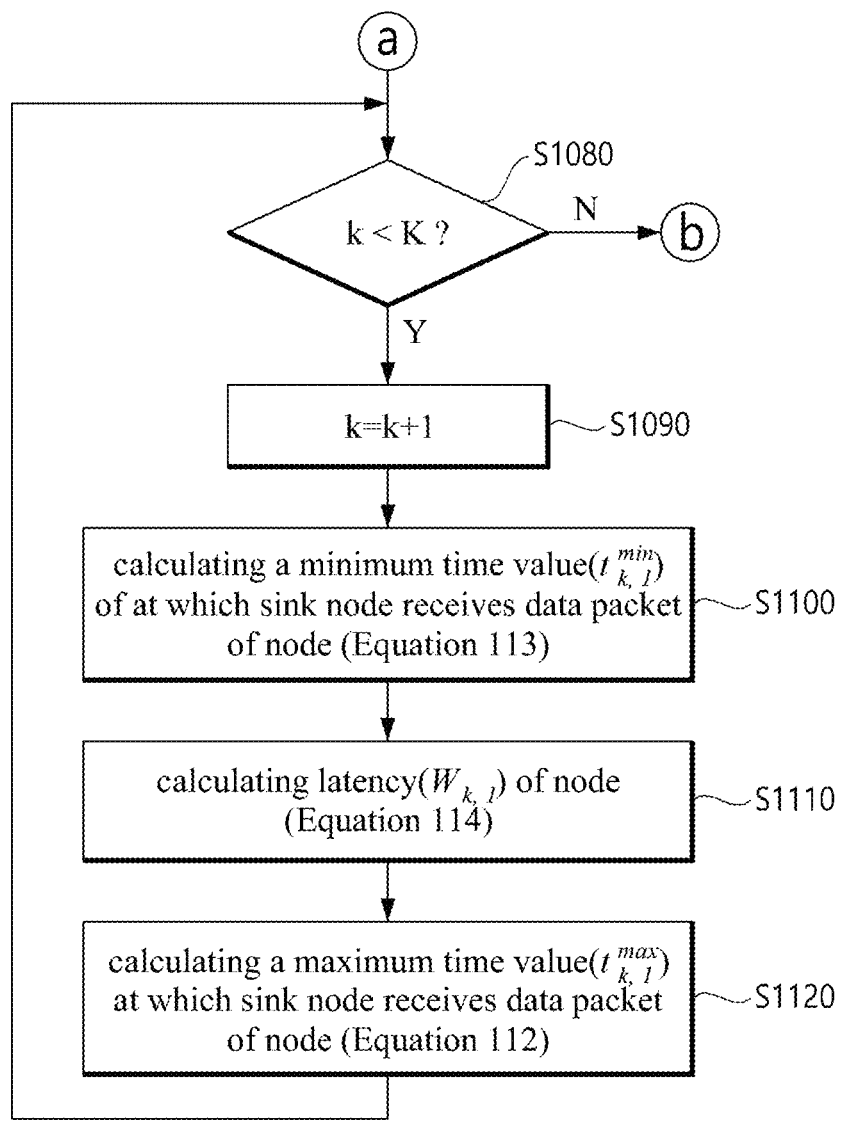

[FIG 2C]
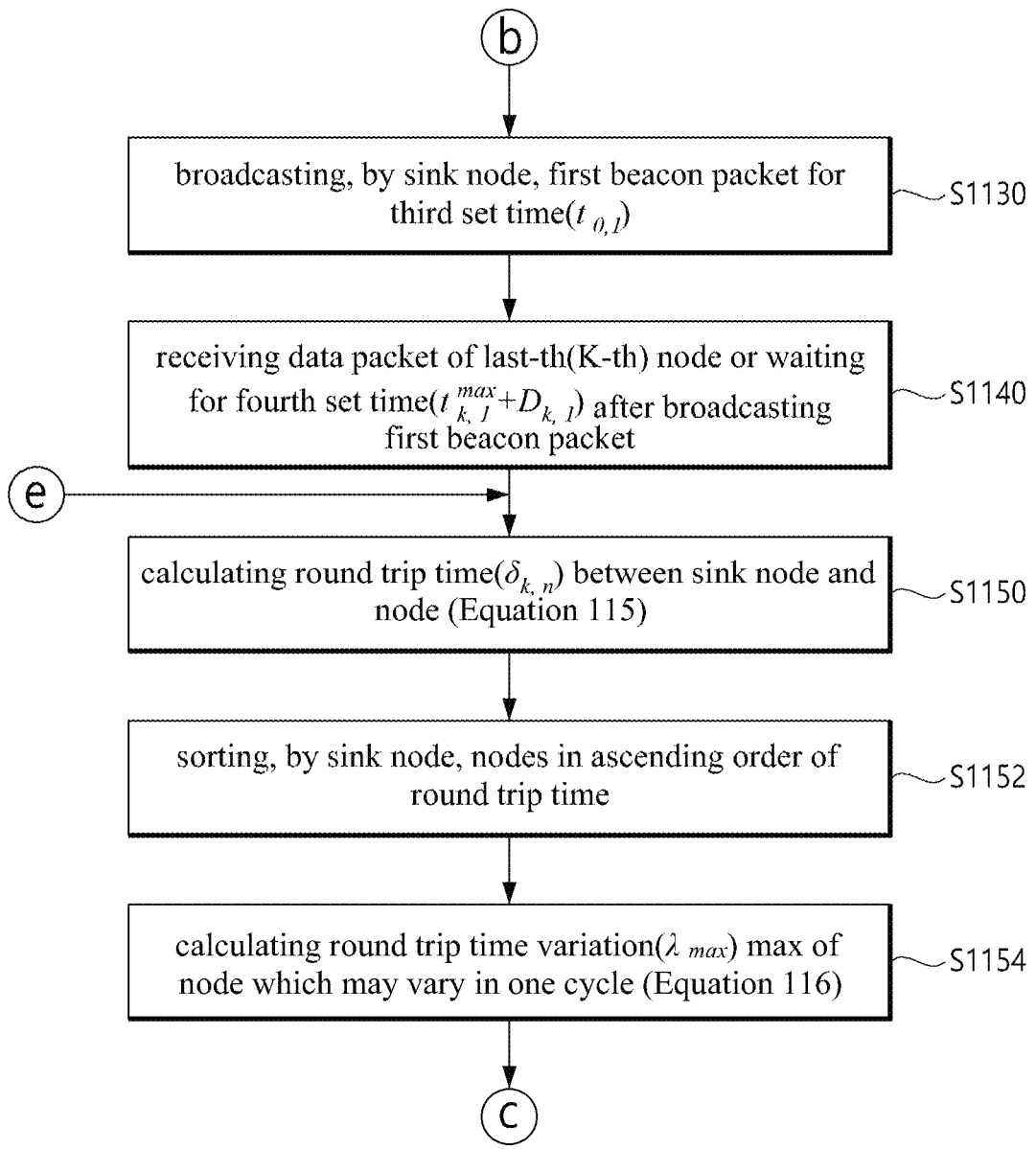

[FIG 2D]
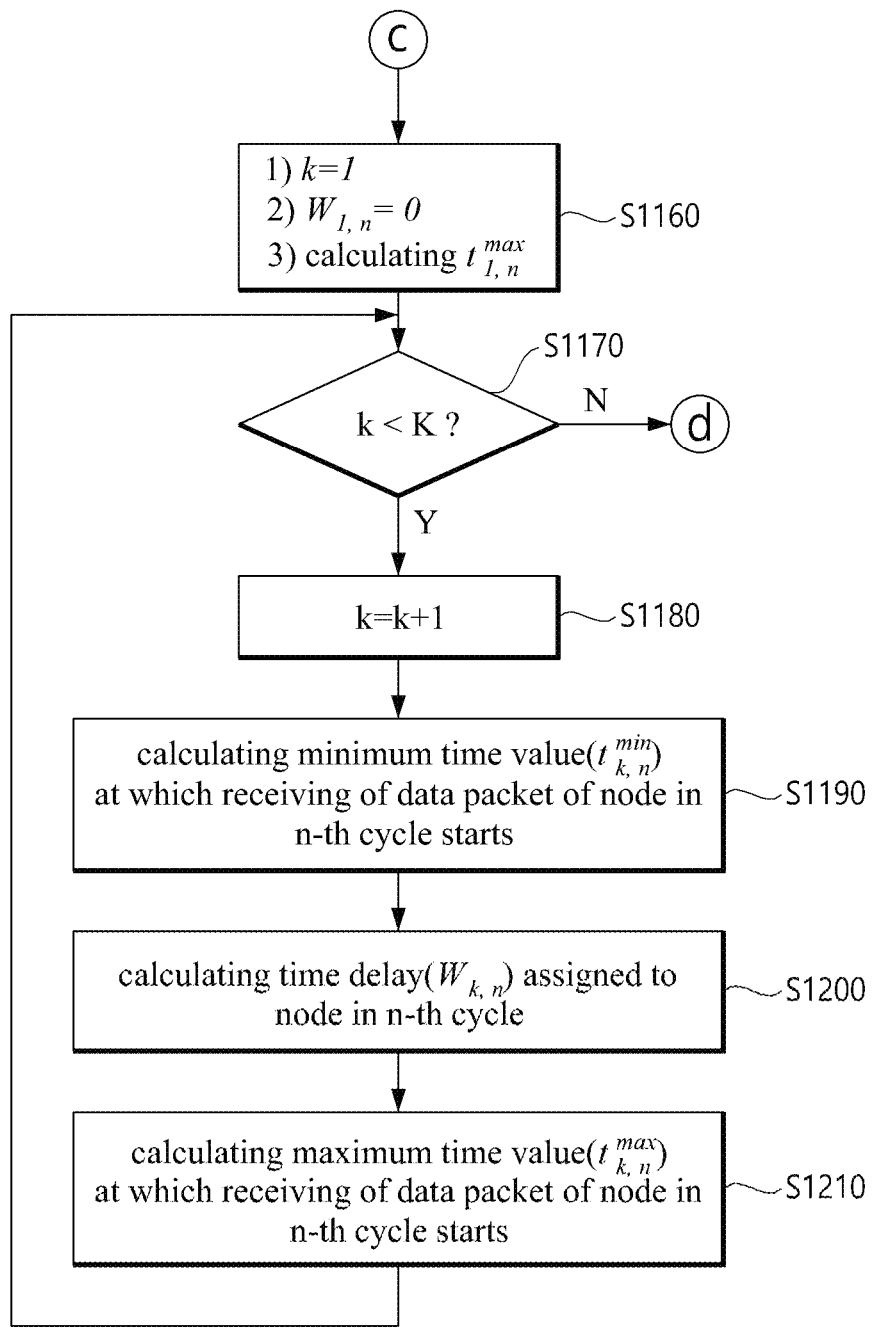

[FIG 2E]
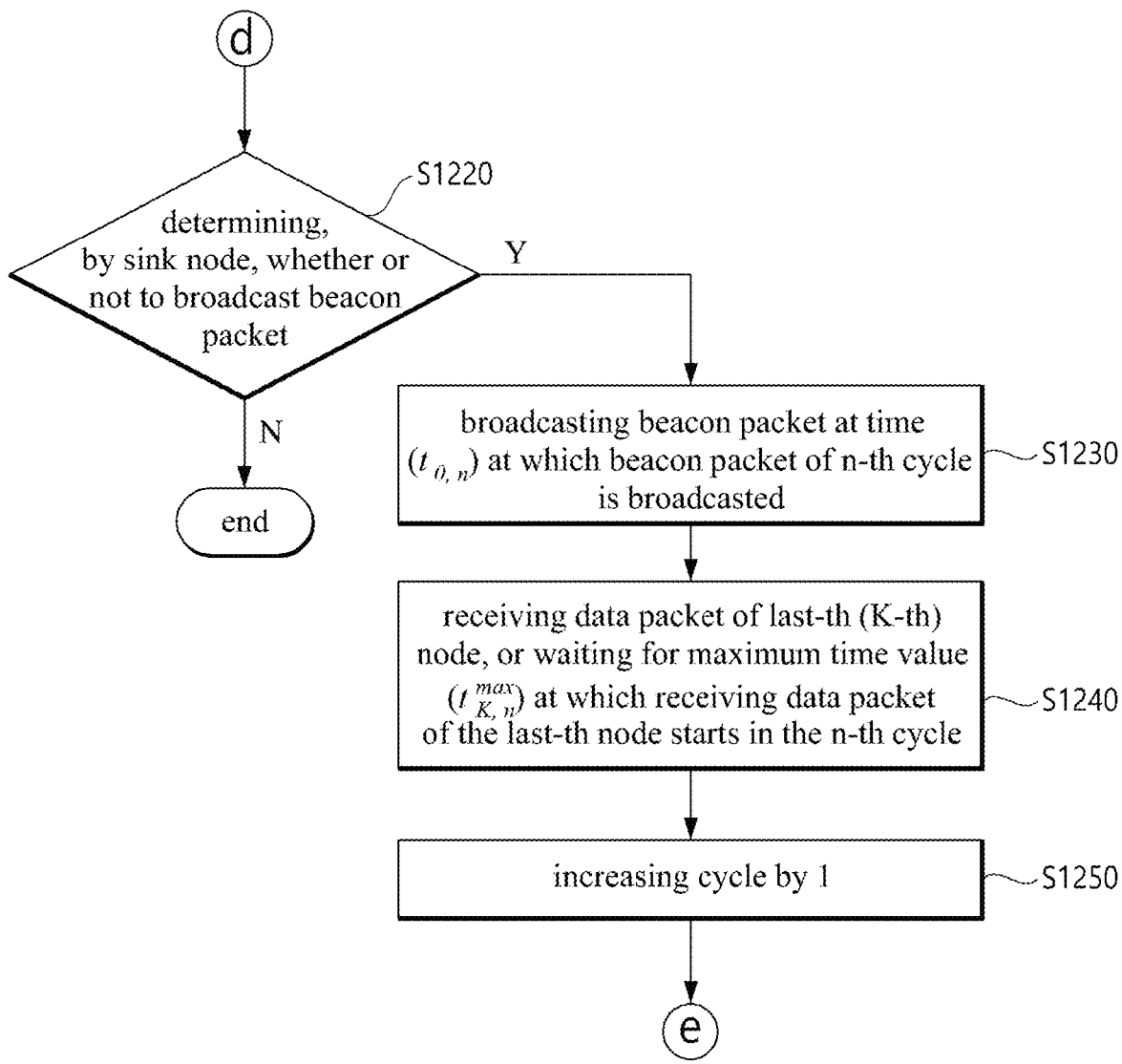

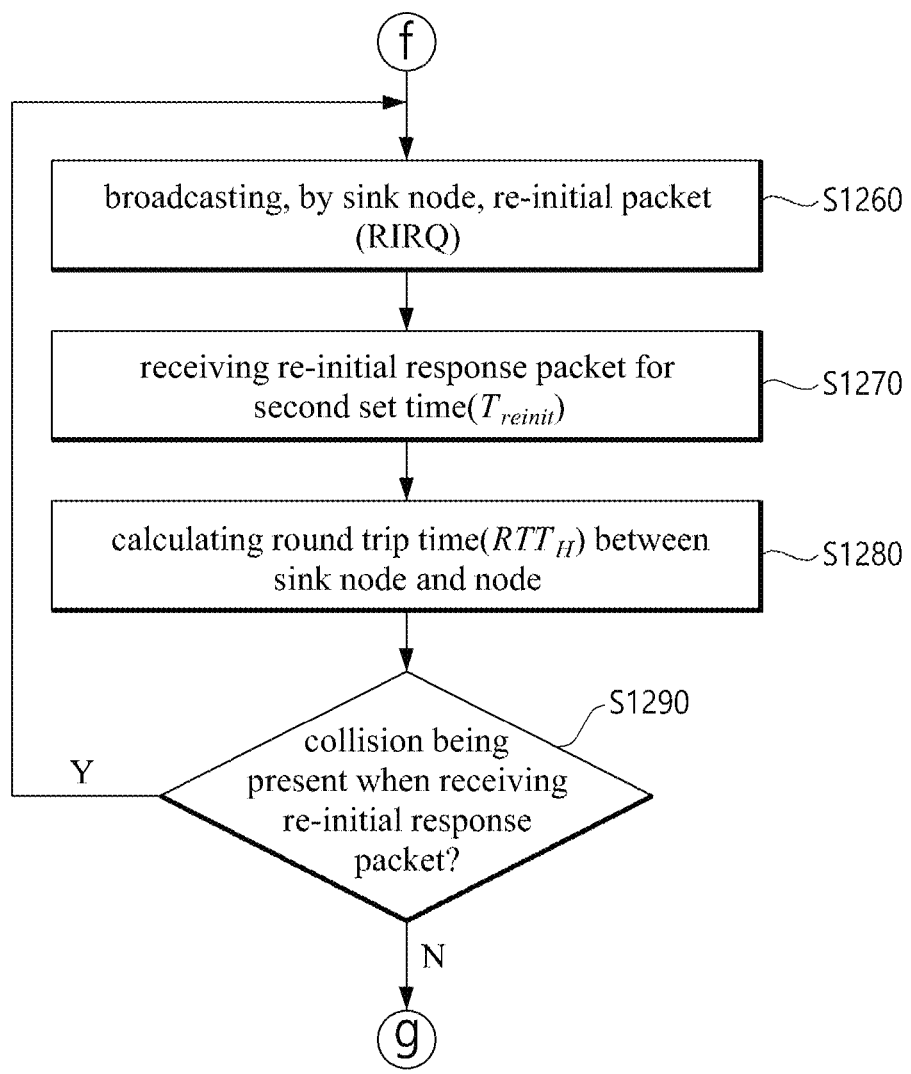
[FIG 2F]

[FIG 3]
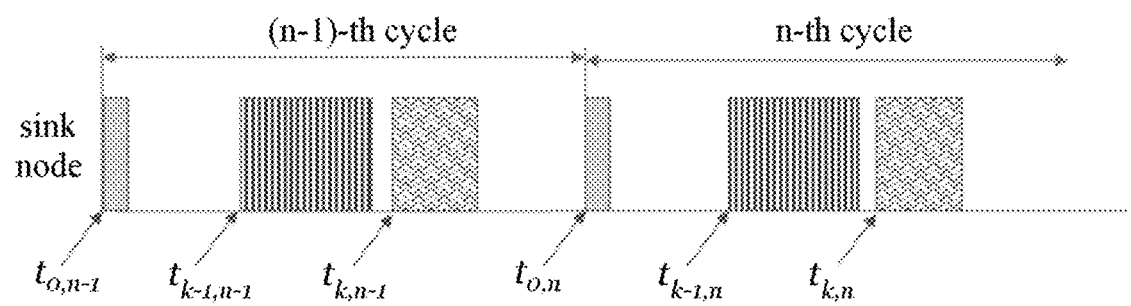

[FIG 4]
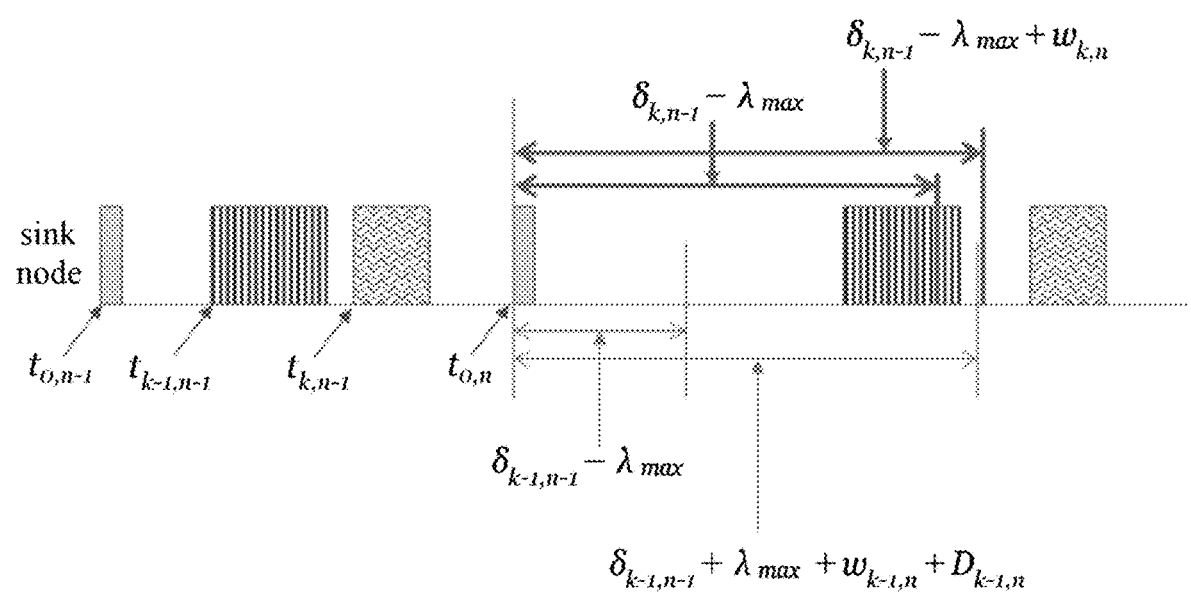

[FIG 5]
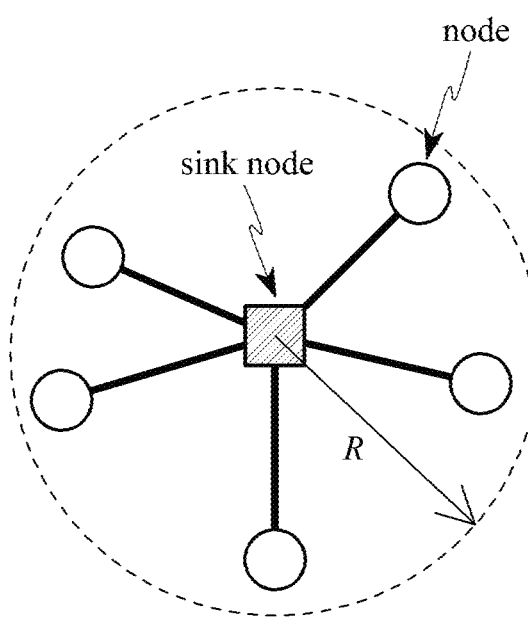

[FIG 6]
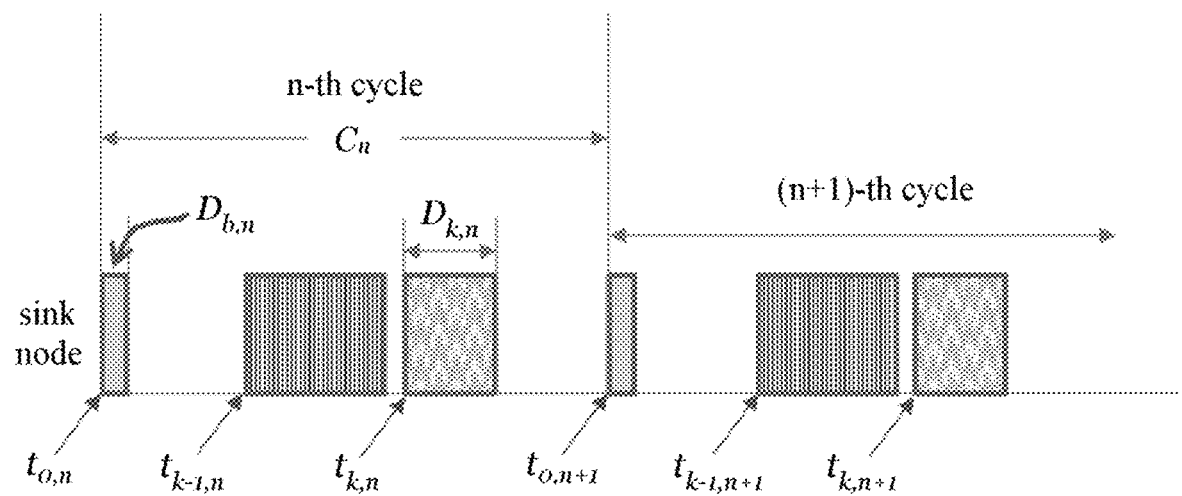

[FIG 7A]
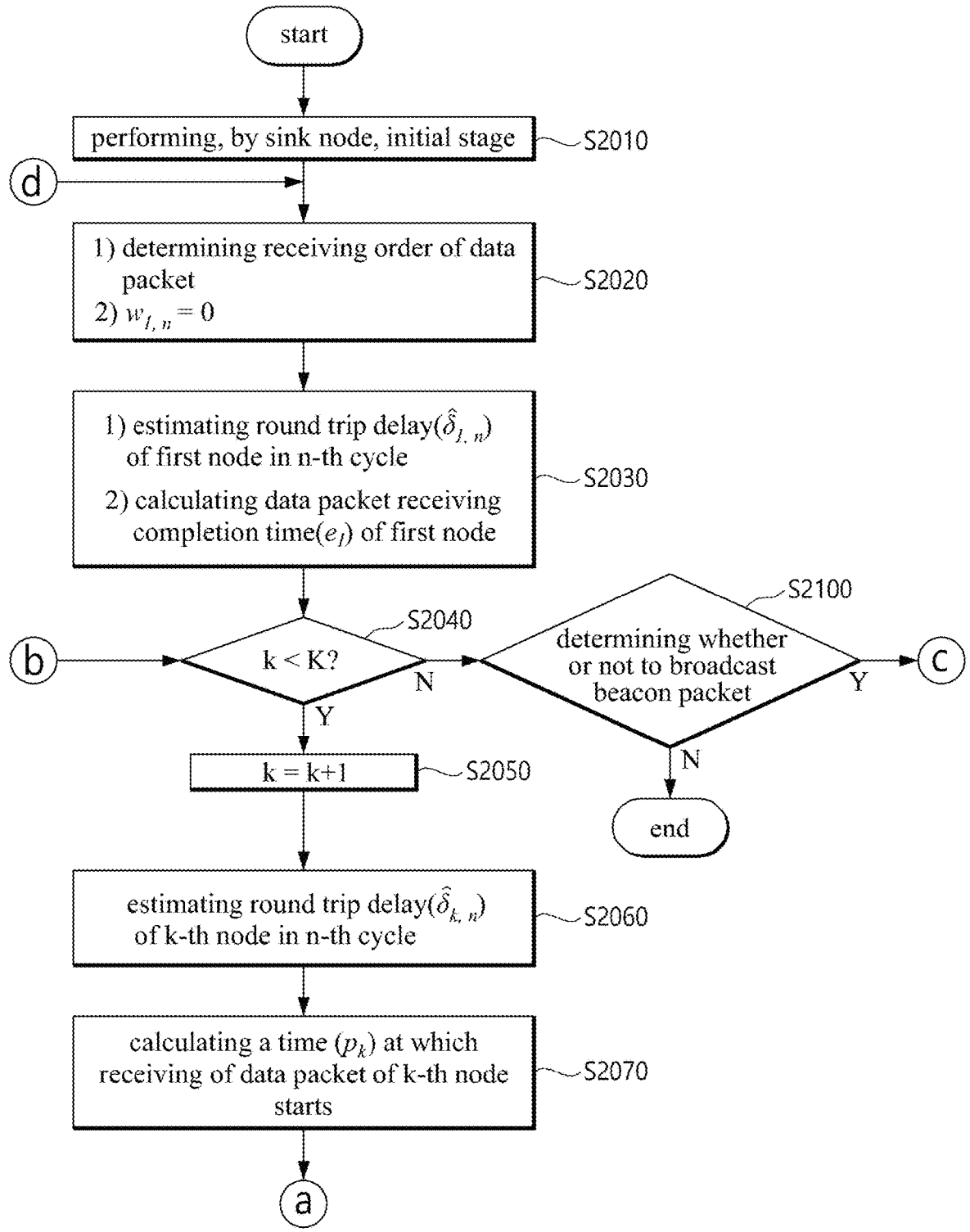

[FIG 7B]
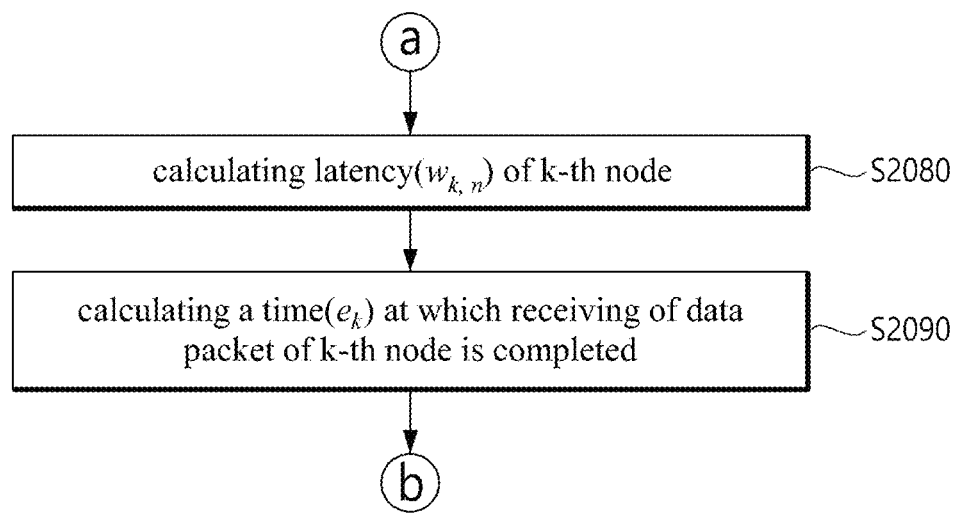

[FIG 7C]
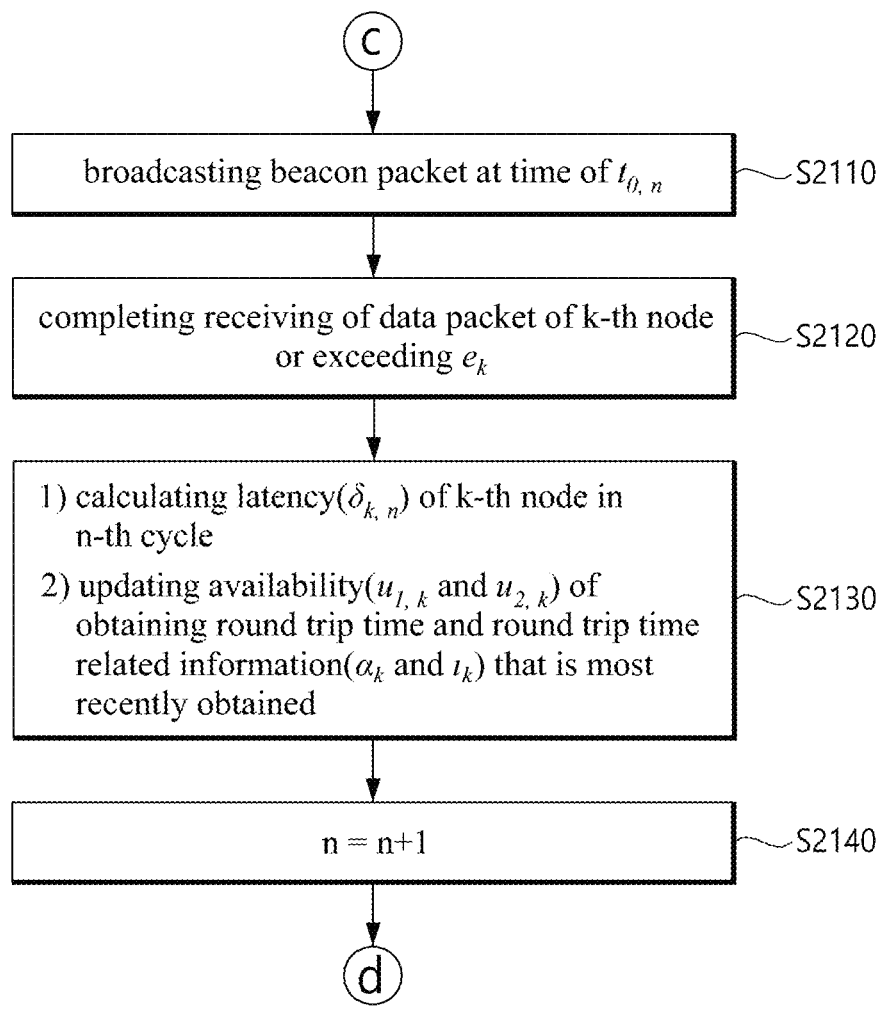

[FIG 8]
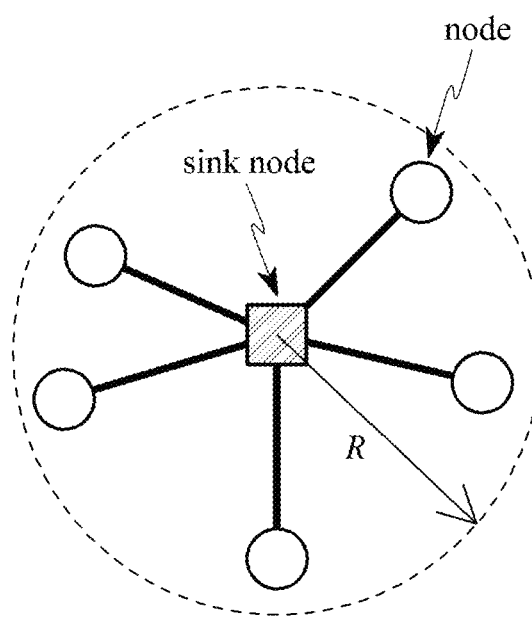

[FIG 9]
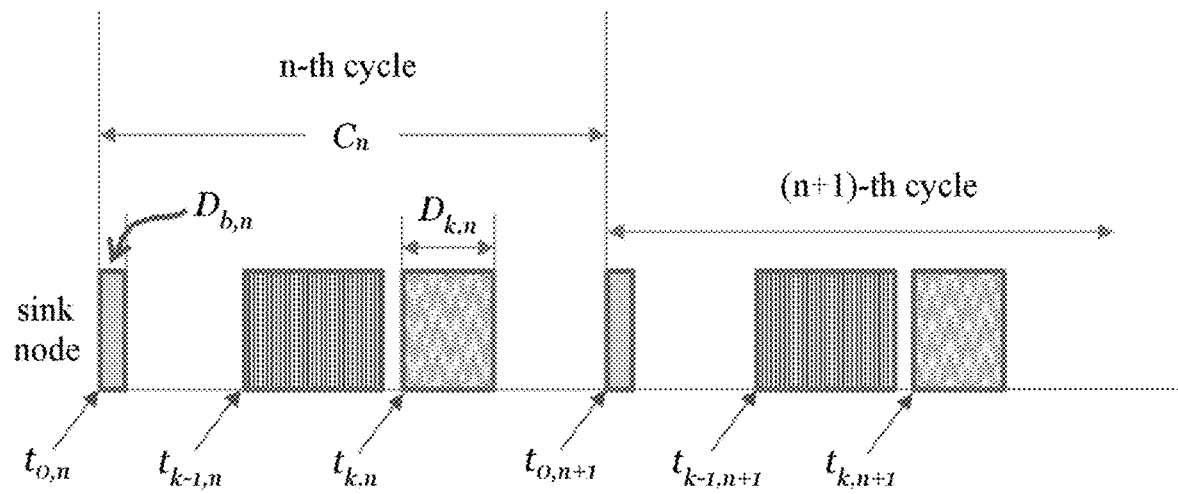

[FIG 10A]
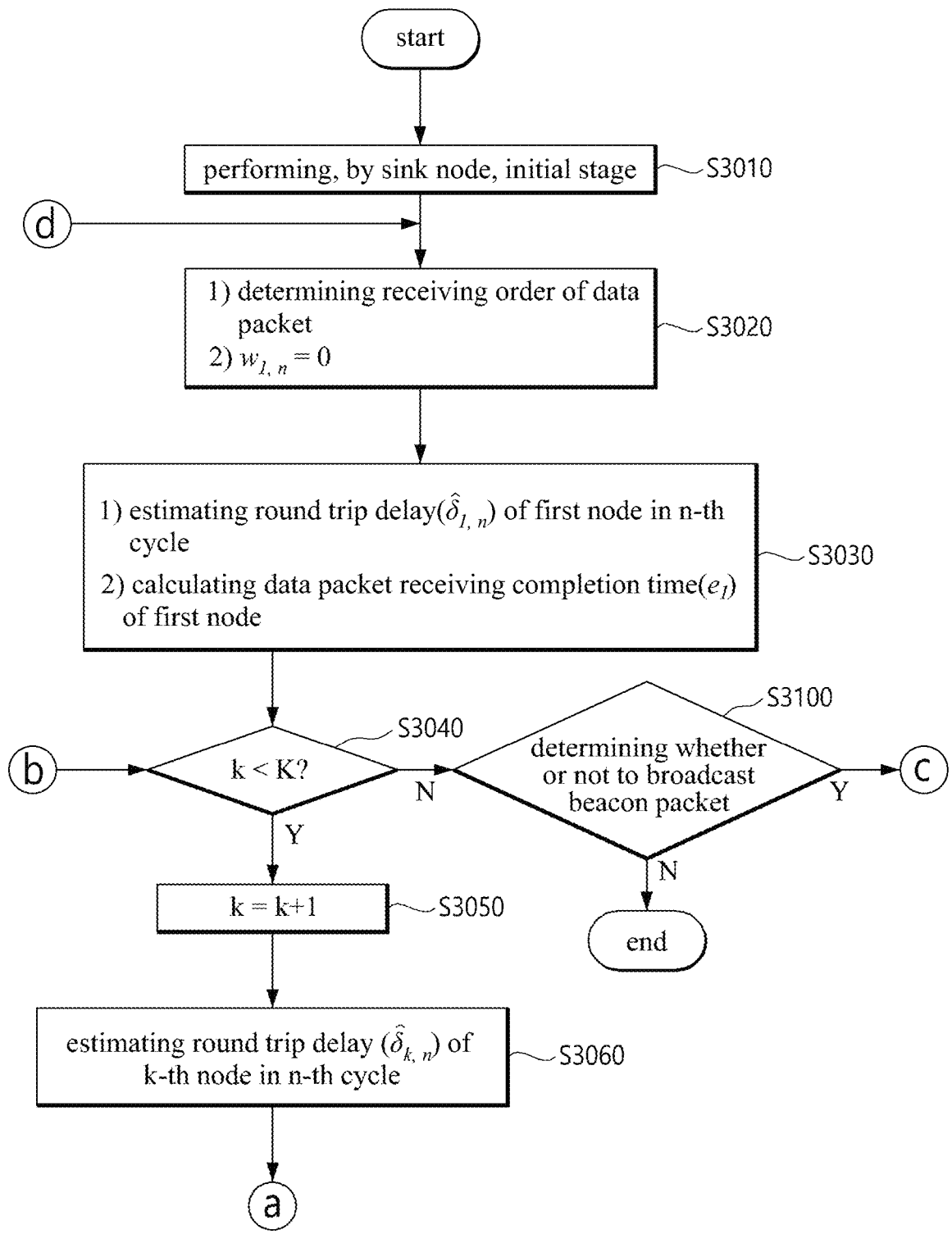

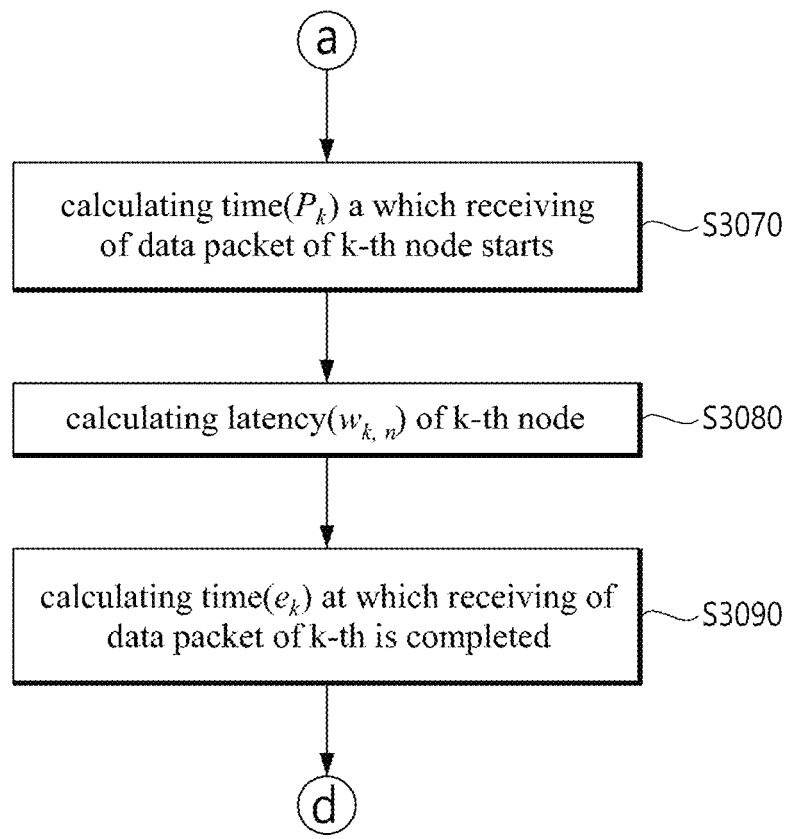
[FIG 10B]

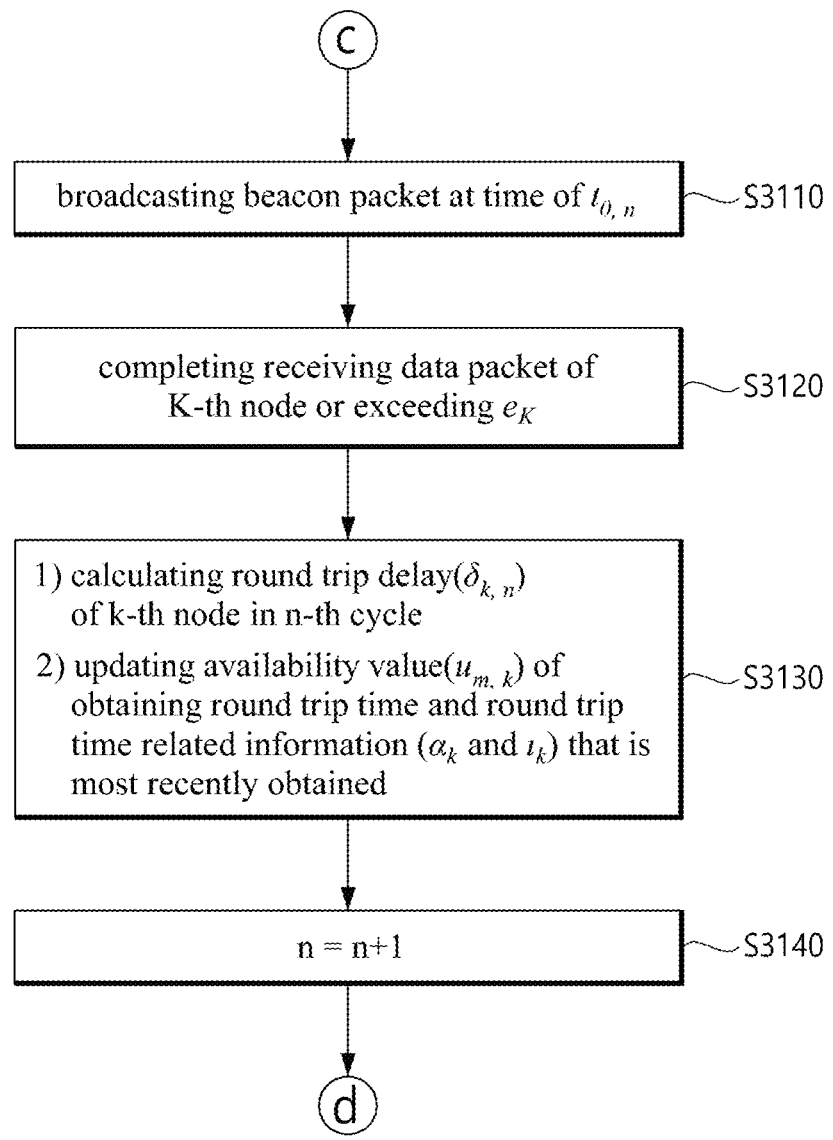
[FIG 10C]

METHOD OF SCHEDULING FOR UNDERWATER WIRELESS MOBILE NETWORK

CROSS-REFERENCE TO RELATED APPLICATIONS

This application is a national phase under 35 U.S.C. § 371 of PCT International Application No. PCT/KR2018/001142 which has an International filing date of Jan. 25, 2018, which claims priority to Korean Application Nos. 10-2017-0173414, filed Dec. 15, 2017, 10-2017-0046773, filed Apr. 11, 2017, 10-2017-0011915, filed Jan. 25, 2017, the entire contents of each of which are hereby incorporated by reference.

TECHNICAL FIELD

The present invention relates to a method of scheduling for an underwater wireless mobile network. Particularly, the present invention relates to a method of scheduling for a underwater wireless mobile network, whereby the method may consider a method of scheduling that does not cause collision at a specific time domain, and improve network efficiency by receiving in a sink node a packet in a packet train form in consideration with a transfer velocity of a sound wave and a packet length rather than performing orthogonalization to avoid transmission time overlap at a specific time.

In addition, the present invention relates to a method of scheduling for an underwater wireless mobile network, whereby under a network environment where a round trip time is long and a transmission velocity of a physical layer is low as underwater sound wireless mobile network, etc., when multiple nodes transmit a data packet to a sink node by using a time division multiple access method, a round trip time due to the mobility of a node is tracked in a cycle unit, and thus an idle time is minimized when the sink node receives a data packet from the nodes. Accordingly, network efficiency according to channel usage efficiency may be remarkably improved.

In addition, the present invention relates to a method of scheduling for an underwater wireless mobile network, whereby under a network environment where a round trip time is long and a transmission velocity of a physical layer is low as underwater sound wireless mobile network, etc., when multiple nodes transmit a data packet to a sink node by using a time division multiple access method, a round trip time due to the mobility of a node is tracked in a cycle unit, and thus an idle time is minimized when the sink node receives a data packet from the nodes. Accordingly, network efficiency according to channel usage efficiency may be remarkably improved.

BACKGROUND ART

Typically, in an underwater wireless network, a sound wave is used. In an underwater wireless network using the above sound wave, a long propagation delay due to a transfer velocity of a sound wave which is relatively slower than that of an electromagnetic wave, and degradation in network efficiency due to a packet length that becomes long by a slow data transfer velocity of a physical layer which is caused by a narrow bandwidth of an underwater sound modem are major objects to overcome.

In an underwater wireless network topology, a centralized method in which transfer information from multiple nodes to one or multiple sink nodes is a main traffic, and a distributed multi-hop method are used, but the centralized method is advantageous in terms of network efficiency. All networking methods currently in commercial use are also the centralized method. The centralized method generally uses resources such as space/time/frequency/symbol, etc. by performing orthogonalization.

In a communication network system using an electromagnetic wave in the air in which a propagation delay is close to "0", when two nodes present within the same collision range transmit a packet at the same time, a collision occurs. However, underwater, a collision may not occur due to a slow transfer velocity of a sound wave. For example, assuming that a transfer velocity of a sound wave is 1,500 m/s, when two nodes spaced apart 1.5 km from each other transmit a data packet having a length of 1 second at the same time, bypassing a time required for switching between transmitter-receiver, as soon as each node completes transmitting a data packet, receiving a packet of the other node starts. In detail, when two nodes simultaneously transmit a packet having a length of 1 second at a time of 0 seconds, at a time of 1 seconds, transmission of two nodes are completed, and receiving data from the opponent node starts, and thus packet transmission of the node does not affect on receiving a packet of the opponent node, and at a time of 2 seconds, receiving a packet in both nodes is completed. When data is sequentially transmitted, 4 seconds is required in total and herein, network efficiency is improved up to 2 times. However, in the above case, when two nodes move in a direction to be close from each other, collision occurs. However, in a conventional underwater wireless media access control protocol, the mobility of the node is not considered.

In Korean Patent No. 1522279 (Invention title: Precise time-bound time division multiple access method of underwater acoustic networks, hereinafter, referred to the patent document), the mobility of the node is considered. However, an initial position of each node has to be provided, the node has to be fixed during an initial stage, mobile velocity information of each node has to be continuously updated in each cycle, and time synchronization is essential. Further, the patent document discloses a method of estimating a position of each node by using velocity information of each node, and of estimating a round trip time based on the same. However, the above method is limited to find application in an environment where an error according to accumulation of velocity information of the underwater node velocity information becomes large as time goes on. In addition, the patent document does not provide a detailed method of time synchronization, and does not disclose a countermeasure to the synchronization error. Thus, initial positional or velocity information of each node may not be provided or the method is not usable when time synchronization is not available.

DISCLOSURE

Technical Problem

According to one aspect to solve the above object, an object of the present invention is to provide a method of scheduling for an underwater wireless mobile network, the method being operated regardless of navigation information of a mobile node underwater, and capable of improving network throughput since additional packet switching for time synchronization is not required since time synchronization is not required.

Another object of the present invention is to provide a method of scheduling for an underwater wireless mobile network, the method being capable of improving network efficiency through channel usage efficiency improvement under a network environment where a round trip time is long and a transmission velocity of a physical layer is slow as underwater wireless mobile network, being capable of finding application in the field where time synchronization is not available or many resources are required for the same as the method does not require time synchronization, and not requiring periodic re-initialization since an error is not accumulated.

Still another object of the present invention is to provide a method of scheduling for a underwater wireless mobile network, the method being capable of improving network efficiency through channel usage efficiency improvement under a network environment where a round trip time is long and a transmission velocity of a physical layer is slow as underwater wireless mobile network, being capable of finding application in the field where time synchronization is not available or many resources are required for the same as the method does not require time synchronization, and not requiring periodic re-initialization since an error is not accumulated.

Technical Solution

In order to accomplish the above object, according to one aspect, the present invention provides a method of scheduling for an underwater mobile network, wherein the method is performed for a network topology configured with one sink node and multiple nodes, the method including: a first step of broadcasting, by the sink node, an initial packet to the multiple nodes; a second step of receiving, by the sink node, an initial response packet from the multiple nodes for a first set time $T_{init}$; a third step of calculating, by the sink node, a round trip time $RTT_H$ between the sink node and the multiple nodes from the initial response packet received in the second step; a fourth step of determining, by the sink node, whether or not a collision occurs when receiving the initial response packet; a fifth step of sorting, by the sink node, the nodes in ascending order of the round trip time by using round trip times $RTT_H$ calculated in the third step when a collision does not occur when receiving the initial response packet in the fourth step; a sixth step of setting, by the sink node, a parameter k to 1, and a latency $w_{1,1}$ of a first node to "0"; a seventh step of calculating, by sink node, a maximum time value $t_{1,1}^{max}$ at which the sink node starts receiving a data packet of the first node; an eighth step of determining whether or not the parameter (k) is smaller than a last-th (K-th) parameter; a ninth step of setting the parameter (k) to k+1 when the parameter (k) is determined to be smaller than the last-th (K-th) parameter in the eighth step; a tenth step of calculating, by sink node, a minimum time value $t_{k,1}^{min}$ at which the sink node receives a data packet of a k-th node; an 11-th step of calculating, by the sink node, a latency $w_{k,1}$ of the k-th node; a 12-th step of calculating, by the sink node, a maximum time value $t_{k,1}^{max}$ at which the sink node receives a data packet of the k-th node, and performing the eighth step; a 13-th step of broadcasting, by the sink node, to the multiple nodes a first beacon packet for a third set time $t_{0,1}$ when the parameter (k) is determined not to be smaller than the last-th (K-th) parameter in the eighth step; a 14-th step of waiting, by the sink node, for a fourth set time $t_{K,1}^{max}+D_{K,1}$ after receiving a data packet of the last-th (K-th) node or after broadcasting the first beacon packet in the 13-th step; a 15-th step of calculating, by the sink node, a round trip time $\delta_{k,n}$ between the sink node and the k-th node; a 16-th step of sorting, by the sink node, the nodes in ascending order of the round trip time by using round trip times $\delta_{k,n}$ calculated in the 15-th step; a 17-th step of calculating, by the sink node, a round trip time variation $\lambda_{max}$ of the node in which the round trip time varies in one cycle; a 18-th step of setting the parameter k to 1, setting, by the sink node, a time delay $W_{1,n}$ assigned to the first node in an n-th cycle to "0", and calculating a maximum time value $t_{1,n}^{max}$ at which receiving of a data packet of the first node in the n-th cycle starts; 19-th step of determining whether or not the parameter (k) is smaller than the last-th (K-th) parameter; a 20-th step of setting the parameter (k) to k+1 when the parameter (k) is determined to be smaller than the last-th(K-th) parameter in the 19-th step; a 21-th step of calculating, by the sink node, a minimum time value $t_{k,n}^{min}$ at which receiving of a data packet of the k-th node in the n-th cycle starts; a 22-th step of calculating, by the sink node, a time delay $W_{k,n}$ assigned to the k-th node in the n-th cycle; a 23-th step of calculating, by the sink node, a maximum time value $t_{k,n}^{max}$ at which receiving of a data packet of the k-th node in the n-th cycle starts, and performing the 19-th step; a 24-th step of determining, by the sink node, whether or not to broadcast a beacon packet when the parameter (k) is determined not to be smaller than the last-th (K-th) parameter in the 19-th step; and a 25-th step of ending the scheduling method when the beacon packet is not broadcasted in the 24-th step.

According to one aspect, in the method of scheduling for the underwater mobile network, when the sink node determines to broadcast the beacon packet in the 24-th step, the method may further perform: a 26-th step of broadcasting, by the sink node, to the nodes the beacon packet at a time $t_{0,n}$ at which a beacon packet of the n-th cycle is broadcasted; a 27-step of receiving, by the sink node, a data packet of the last-th (K-th) node or waiting a maximum time value $t_{k,n}^{max}$ at which receiving of a data packet of the last-th node in the n-th cycle starts; and a 28-th step of increasing, by the sink node, a cycle by 1, and performing the 15-th step.

According to one aspect, in the method of scheduling for the underwater mobile network, when a collision occurs when receiving the initial response packet in the fourth step, the method may further perform: a 29-th step of broadcasting, by the sink node, to the nodes a re-initial packet; a 30-th step of receiving, by the sink node, a re-initial response packet for a second set time $T_{reinit}$; a 31-th step of calculating, by the sink node, a round trip time $RTT_H$ between the sink node and the nodes from the re-initial response packet received in the 30-th step; and a 32-th step of determining, by the sink node, whether or not a collision occurs when receiving the re-initial response packet, wherein when a collision occurs when receiving the re-initial response packet in the 32-th step, the 29-th step may be performed.

According to one aspect, in the method of scheduling for the underwater mobile network, when a collision does not occur when receiving the re-initial response packet in the 32-th step, the fifth step may be performed.

According to one aspect, in the method of scheduling for the underwater mobile network, the first set time $T_{init}$ may be determined as Equation 101 below, $$T_{init}=RTT_{max}+D_{IRQ}+D_{IRP}\pm D_{IRP}+T_{pro} \qquad \text{[Equation 101]}$$

[wherein, $RTT_{max}$ is a maximum value of a round trip time between the sink node and the node, and is determined as Equation 102 below, $D_{IRQ}$ is a value obtained by converting a length of an initial packet to a time, $D_{IRP}$ is a value obtained by converting a length of the initial response packet to a time, and $T_{pro}$ is a time taken, by the node, to transmit the initial response packet after the node completes receiving the initial packet, $$RTT_{max}=2r/c \quad \text{[Equation 102]}$$

(r is a maximum communication radius of a modem, and c is a velocity of a sound wave)].

According to one aspect, in the method of scheduling for the underwater mobile network, wherein the round trip time $RTT_H$ between the sink node and the multiple nodes may be determined as Equation 103 below, $$RTT_H=t_{IRP}(H)-t_{IRQ}-T_{pro}-D_{IRQ} \quad \text{[Equation 103]}$$

[wherein, $t_{IRP}(H)$ is a time at which an initial response packet is received from a node H, and $t_{IRQ}$ is a time at which an initial packet is broadcasted].

According to one aspect, in the method of scheduling for the underwater mobile network, the maximum time value $t_{1,1}^{max}$ at which the sink node starts receiving the data packet of the first node may be determined as Equation 108 below, $$t_{1,1}^{max}=t_{0,1}+D_b+T_{pro}+\delta_{1,1}+\{t_{0,1}+RTT_{max}/2+D_b+T_{pro}-(\tau_1-\delta_{1,1}/2)\}\times 2\times V/c \quad \text{[Equation 108]}$$

[wherein, $t_{0,1}$ is a time at which the sink node starts broadcasting an initial beacon packet, $D_b$ is a value obtained by converting a length of a beacon packet to a time, $\delta_{1,1}$ is a round trip time of the first node, $\tau_1$ is a time at which the round trip time of the first node with the sink node is obtained, and V is a maximum relative velocity between the sink node and the node].

According to one aspect, in the method of scheduling for the underwater mobile network, the minimum time value $t_{k,1}^{min}$ at which the sink node receives the data packet of the k-th node may be determined as Equation 113 below, $$t_{k,1}^{min}=t_{0,1}+D_b+T_{pro}+\delta_{k,1}+\{t_{0,1}+RTT_{max}/2+D_b+T_{pro}-(\tau_1-\delta_{k,1}/2)\}\times 2\times V/c \quad \text{[Equation 113]}$$

[wherein, $\delta_{k,1}$ is a round trip time of the k-th node, and $\tau_k$ is a time at which $\delta_{k,1}$ is obtained].

According to one aspect, in the method of scheduling for the underwater mobile network, the latency $w_{k,1}$ of the k-th node may be determined as Equation 114 below, $$w_{k,1}=\max\{0,t_{k-1,1}^{max}+D_{k-1,1}-t_{k,1}^{min}\} \quad \text{[Equation 114]}$$

[wherein, max{A,B} is a function of selecting a large value between A and B, $t_{k-1,1}^{max}$ is a maximum time value at which the sink node receives a data packet of a (k−1)-th node and is determined as Equation 112 below, and $D_{k-1,1}$ is a value obtained by converting a length of a data packet of the (k−1)-th node to a time, $$t_{k-1,1}^{max}=t_{0,1}+D_b+T_{pro}+w_{k-1,1}+\delta_{k-1,1}+\{t_{0,1}+RTT_{max}/2+D_b+T_{pro}+w_{k-1,1}-(\tau_{k-1}-\delta_{k-1,1}/2)\}\times 2\times V/c \quad \text{[Equation 112]}$$

($\delta_{k-1,1}$ is a round trip time of the (k−1)-th node, $w_{k-1,1}$ is a latency of the (k−1)-th node, and $\tau_{k-1}$ is a time at which $\delta_{k-1,1}$ is obtained)].

According to one aspect, in the method of scheduling for the underwater mobile network, the round trip time $\delta_{k,n}$ between the sink node and the k-th node may be determined as Equation 115 below, $$\delta_{k,n}=t_{k,n}-w_{k,n}-t_{0,n}-D_{b,n} \quad \text{[Equation 115]}$$

[wherein, $t_{0,n}$ is a time at which broadcasting of a beacon packet in the n-th cycle starts, $t_{k,n}$ is a time at which receiving of a data packet of the k-th node in the n-th cycle starts, $w_{k,n}$ is a time delay assigned to the k-th node in the n-th cycle, and $D_{b,n}$ is a value obtained by converting a beacon length in the n-th cycle to a time].

According to one aspect, in the method of scheduling for the underwater mobile network, the round trip time variation $\lambda_{max}$ of the node in which the round trip time varies in one cycle may be determined as Equation 116 below, $$\lambda_{max}=2\times V\times(t_{0,n}-t_{0,n-1})/c \quad \text{[Equation 116]}$$

[wherein, $t_{0,n-1}$ is a time at which receiving of a data packet in an (n−1)-th cycle starts].

According to one aspect, in the method of scheduling for the underwater mobile network, a difference between the time $t_{k,n-1}$ at which the data packet of each node in the (n−1)-th cycle is received and the time $t_{k,n}$ at which the data packet of each node in the n-th cycle may be approximated as Equation 117 below, $$t_{k,n}-t_{k,n-1}\approx t_{0,n}-t_{0,n-1}, 1\leq k\leq K \quad \text{[Equation 117]}$$

According to one aspect, in the method of scheduling for the underwater mobile network, the second set time $T_{reinit}$ may be determined as Equation 105 below, $$T_{reinit}=RTT_{max}+D_{RIRQ}+D_{RIRP}+T_{pro} \quad \text{[Equation 105]}$$

[wherein, $D_{RIRQ}$ is a value obtained by converting a length of a re-initial packet to a time, and $D_{RIRP}$ is a value obtained by converting a length of a re-initial response packet to a time].

According to one aspect, in the method of scheduling for the underwater mobile network, the maximum time value $t_{1,n}^{max}$ at which receiving of the data packet of the first node in the n-th cycle starts may be determined as Equation 118 below, $$t_{1,n}^{max}=\delta_{1,n-1}+\lambda_{max}+w_{1,n}+D_{1,n} \quad \text{[Equation 118]}$$

[wherein, $\delta_{1,n-1}$ is a round trip time of the first node in the (n−1)-th cycle, $D_{1,n}$ is a value obtained by converting a length of a data packet of the first node in the n-th cycle to a time].

According to one aspect, in the method of scheduling for the underwater mobile network, the minimum time value $t_{k,n}^{min}$ at which sink node starts receiving the data packet of the k-th node in the n-th cycle may be calculated as Equation 119 below, $$t_{k,n}^{min}=\delta_{k,n-1}-\lambda_{max} \quad \text{[Equation 119]}$$

[wherein, $\delta_{k,n-1}$ is a round trip time of the k-th node in the n−1-th cycle].

According to one aspect, in the method of scheduling for the underwater mobile network, the time delay $W_{k,n}$ assigned by the sink node to the k-th node in the n-th cycle may be calculated as Equation 120 below, $$w_{k,n}=\max\{0,t_{k-1,n}^{max}-t_{k,n}^{min}\} \quad \text{[Equation 120]}$$

[wherein, $t_{k-1,n}^{max}$ is a maximum time value at which receiving of a data packet of a (k−1)-th node in the n-th cycle starts].

According to one aspect, in the method of scheduling for the underwater mobile network, the maximum time value $t_{k,n}^{max}$ at which the sink node starts receiving the data packet of the k-th node in the n-th cycle may be calculated as Equation 121 below, $$t_{k,n}^{max}=\delta_{k,n-1}+\lambda_{max}+w_{k,n}+D_{k,n} \quad \text{[Equation 121]}$$

[$D_{k,n}$ is a value obtained by converting a length of a data packet of the k-th node in the n-th cycle to a time].

According to another aspect to solve the another object, the present invention provides a method of scheduling for an underwater wireless mobile network, wherein the method is performed for a network topology using a timed division multiple access method and configured with one sink node broadcasting a beacon packet including a transmission schedule, and multiple nodes transmitting to the sink node a data packet according to a transmission schedule by receiving the beacon packet of the sink node, the method including: a first step of performing, by the sink node, an initial stage; a second step of setting, by the sink node, a receiving order of a data packet receive, and setting a time delay $w_{1,n}$ assigned to a first node in an n-th cycle to 0; a third step of estimating, by the sink node, a round trip time $\hat{\delta}_{1,n}$ of the first node in the n-th cycle, and calculating a data packet receiving completion time $e_1$ of the first node; a fourth step of determining, by the sink node, whether or not a parameter k is smaller than a last-th (K-th) parameter; a fifth step of setting, parameter k to k+1 when the parameter k is determined to be smaller than the last-th (K-th) parameter in the fourth step; a sixth step of estimating, by the sink node, a round trip time $\hat{\delta}_{k,n}$ of a k-th node in the n-th cycle; a seventh step of calculating, by the sink node, an estimated time value $p_k$ at which the sink node starts receiving a data packet of the k-th node by using the round trip time $\hat{\delta}_{k,n}$ of the k-th node estimated in the sixth step when the k-th node transmits the data packet as soon as the beacon packet is received; an eighth step of calculating, by the sink node, a latency of the k-th node by using the calculated estimated time value $p_k$ at which the sink node starts receiving the data packet of the k-th node; and a ninth step of calculating, by the sink node, an estimated time value $e_k$ at which receiving of the data packet of the k-th node is completed by using the estimated time value $p_k$ at which the sink node starts receiving the data packet of the k-th node and which is calculated in the seventh step, and the latency $W_{k,n}$ of the k-th node which is calculated in the eighth step, and performing the fourth step.

According to another aspect, in the method of scheduling the underwater wireless mobile network, when the parameter k is determined not to be smaller than the last-th (K-th) parameter in the fourth step, the method may further include a tenth step of determining, by the sink node, whether or not to broadcast a beacon packet; wherein when the beacon packet is not broadcasted in the tenth step, the scheduling method may be ended.

According to another aspect, in the method of scheduling the underwater wireless mobile network, when the beacon packet is broadcasted in the tenth step, the method may further include: a 11-th step of broadcasting, by the sink node, the beacon packet at a time $t_{0,n}$ at which the sink node starts broadcasting the beacon packet in the n-th cycle; a 12-th step of receiving a data packet of a K-th node or waiting until the estimated time value $e_k$ at which receiving of the data packet of the K-th node is completed exceeds; a 13-th step of calculating, by the sink node, a round trip time $\hat{\delta}_{k,n}$ of a k-th node in the n-th cycle, and updating availability values $u_{1,k}$ and $u_{2,k}$ of obtaining the round trip time, and round trip time related information $\alpha_k$ and $l_k$ which is the most recently obtained; and a 14-th step of increasing, by the sink node, n by 1, and performing the second step.

According to another aspect, in the method of scheduling the underwater wireless mobile network, the sink node may perform the initial stage in the first step as [Equation 201] below, $$n=1, u_{1,k}=1, u_{2,k}=0, l_k=0, \alpha_k=\hat{\delta}_{k,0}, C_0=C_D \qquad \text{[Equation 201]}$$

[wherein $u_{1,k}$ is a parameter representing an availability of obtaining a round trip time of the k-th node in an (n−1)-th cycle in the n-th cycle; $u_{2,k}$ is a parameter representing an availability of obtaining a round trip time of the k-th node in an (n−2)-th cycle in the n-th cycle; $\alpha_k$ is a round trip time of the k-th node which is the most recently obtained; $l_k$ is a cycle in which $\alpha_k$ is obtained; $\hat{\delta}_{k,0}$ is an initial round trip time between the sink node and each node; $C_0$ is a duration time before the first cycle; and $C_D$ is estimated as Equation 202 below]

$$C_D = \min\{\delta_{1,0}, \ldots, \delta_{K,0}\} + \sum_{k=1}^{K} D_{k,1} \qquad \text{[Equation 202]}$$

[$D_{k,1}$ is a value obtained by converting a length of a data packet of the k-th node in the first cycle to a time].

According to another aspect, in the method of scheduling the underwater wireless mobile network, in the third step, when a round trip time of the first node is successfully obtained in recent two cycles, the round trip time $\hat{\delta}_{1,n}$ of the first node in the n-th cycle may be estimated and the data packet receiving completion time $e_1$ of the first node may be calculated as [Equation 203] below, $$\hat{\delta}_{1,n} = \frac{1}{1-X_{1,n}}(\delta_{1,n-1} + X_{1,n}(t_{0,n} + D_{b,n} - t_{1,n-1})) \qquad \text{[Equation 203]}$$

$$e_1 = t_{0,n} + D_{b,n} + \hat{\delta}_{1,n} + \tau_g$$

[wherein, $\tau_g$ is a guard time, $\delta_{1,n-1}$ is a round trip time of the first node obtained in an (n−1)-th cycle, $D_{b,n}$ is a value obtained by converting a length of a beacon packet in the n-th cycle to a time, $t_{1,n-1}$ is a time at which the sink node starts receiving the data packet of the first node in the (n−1)-th cycle, and $X_{1,n-1}$ is as Equation 204 below]

$$X_{1,n} = \frac{\delta_{1,n-1} - \delta_{1,n-2}}{t_{1,n-1} - t_{1,n-2}} \qquad \text{[Equation 204]}$$

[wherein, $\delta_{1,n-2}$ is a round trip time of the first node obtained in the (n−2)-th cycle, and $t_{1,n-2}$ is a time at which the sink node starts receiving a data packet of the first node in the (n−2)-th cycle].

According to another aspect, in the method of scheduling the underwater wireless mobile network, the [Equation 203] may be solved by solving [Equation 206] below which is simultaneous equations, $$\hat{\delta}_{1,n} = \delta_{1,n-1} + X_{1,n}(\hat{t}_{1,n} - t_{1,n-1})$$

$$\hat{t}_{1,n} = t_{0,n} + D_{b,n} + \hat{\delta}_{1,n} \qquad \text{[Equation 206]}$$

[wherein, $\hat{t}_{1,n}$ is an estimated value of a time $t_{1,n}$ of a time at which receiving of the data packet of the first node in the n-th cycle starts].

According to another aspect, in the method of scheduling the underwater wireless mobile network, in the third step, when a round trip time of the first node is not successfully obtained in recent two cycles for at least one time, the round trip time $\hat{\delta}_{1,n}$ of the first node in the n-th cycle may be estimated and the data packet receiving completion time $e_1$ of the first node is calculated as [Equation 205] below, $$\hat{\delta}_{1,n} = \min\{\delta_{max}, \alpha_1 + 2v_{max}C_{n-1}(n-l_1)/c_{min}\}$$

$$e_1 = t_{0,n} + D_{b,n} + \hat{\delta}_{1,n} \qquad \text{[Equation 205]}$$

[wherein, $\delta_{max}$ is a maximum value of a round trip time, $\alpha_1$ is a round trip time of the first node which is the most recently obtained, $v_{max}$ is a maximum relative velocity between the sink node and the k-th node, $C_{n-1}$ is a duration time of the (n−1)-th cycle, $l_1$ is the most recent cycle in which the round trip time of the first node is obtained, and $c_{min}$ is a minimum transfer velocity of an underwater sound wave].

According to another aspect, in the method of scheduling the underwater wireless mobile network, in the sixth step, when the round trip time of the k-th node is successfully obtained in recent two cycles, the round trip time $\hat{\delta}_{k,n}$ of the k-th node in the n-th cycle may be estimated as [Equation 207] below, $$\hat{\delta}_{k,n} = \delta_{k,n-1} + X_{k,n}(e_{k-1} - t_{k,n-1}) \quad \text{[Equation 207]}$$

[wherein, $\delta_{k,n-1}$ is a round trip time of the k-th node obtained in the (n−1)-th cycle, $e_{k-1}$ is an estimated time value at which the sink node completes receiving the data packet of the (k−1)-th node, $t_{k,n-1}$ is a time at which the sink node starts receiving a data packet of the k-th node in the (n−1)-th cycle, and $X_{k,n}$ is as Equation 211 below]

$$X_{k,n} = \frac{\delta_{k,n-1} - \delta_{k,n-2}}{t_{k,n-1} - t_{k,n-2}} \quad \text{[Equation 211]}$$

[wherein, $\delta_{k,n-2}$ is a round trip time of the k-th node obtained in an (n−2)-th cycle, and $t_{k,n-2}$ is a time at which the sink node starts receiving a data packet of the k-th node in the (n−2)-th cycle].

According to another aspect, in the method of scheduling the underwater wireless mobile network, in the sixth step, when a round trip time of the k-th node is not successfully obtained in recent two cycles for at least one time, the round trip time $(\hat{\delta}_{k,n})$ of the k-th node in the n-th cycle may be estimated as [Equation 212] below, $$\hat{\delta}_{k,n} = \max\{0, \alpha_k - 2v_{max}C_{n-1}(n-l_k)/c_{min}\} \quad \text{[Equation 212]}$$

[wherein, $l_k$ is a cycle in which $\alpha_k$ is obtained]

According to another aspect, in the method of scheduling the underwater wireless mobile network, in the seventh step, the estimated time value $p_k$ at which the sink node starts receiving the data packet of the k-th node may be calculated as [Equation 213] below, $$p_k = t_{0,n} + D_{b,n} + \hat{\delta}_{k,n}. \quad \text{[Equation 213]}$$

According to another aspect, in the method of scheduling the underwater wireless mobile network, in the eighth step, the latency ($W_{k,n}$) of the k-th node may be calculated as [Equation 214] below, $$w_{k,n} = \max\{0, e_{k-1} - p_k\}. \quad \text{[Equation 214]}$$

According to another aspect, in the method of scheduling the underwater wireless mobile network, in the ninth step, when a round trip time of the k-th node is successfully obtained in recent two cycles, the estimated time value $e_k$ at which the sink node completes receiving the data packet of the k-th node may be calculated as [Equation 215] below, $$e_k = p_k + D_{k,n} + w_{k,n} + \tau_g \quad \text{[Equation 215]}$$

[wherein, $D_{k,n}$ is a value obtained by converting a length of a data packet of the k-th node in the n-th cycle to a time].

According to another aspect, in the method of scheduling the underwater wireless mobile network, in the ninth step, when a round trip time of the k-th node is not successfully obtained in recent two cycles for at least one time, the estimated time value $e_k$ at which the sink node completes receiving the data packet of the k-th node may be calculated as [Equation 216] below, $$e_k = t_{0,n} + D_{b,n} + w_{k,n} + \min\{\delta_{max}, \alpha_k + 2v_{max}C_{n-1}(n-l_k)/c_{min}\} + D_{k,n} \quad \text{[Equation 216]}$$

According to another aspect, in the method of scheduling the underwater wireless mobile network, in the 13-th step, in order to update the availability values $u_{1,k}$ and $u_{2,k}$ of obtaining the round trip time, an availability value $u_{2,k}$ of obtaining the round trip time may be updated for all nodes as [Equation 217] below, when the data packet of the k-th node in the n-th cycle is successfully received, [Equation 218] below may be performed, and when the data packet of the k-th node in the n-th cycle is not successfully received, [Equation 219] below may be performed, the round trip time related information $l_k$ which is the most recently obtained may be updated as [Equation 220] below, and when the availability value $u_{1,k}$ of obtaining the round trip time is 1, the round trip time $\delta_{k,n}$ of the k-th node in the n-th cycle may be calculated and the round trip time related information $\alpha_k$ which is the most recently obtained may be updated as [Equation 221] below, $$u_{2,k} = u_{1,k}, \quad \text{[Equation 217]}$$

$$u_{1,k} = 1, \quad \text{[Equation 218]}$$

$$u_{1,k} = 0, \quad \text{[Equation 219]}$$

$$l_k = \max\{l_k, nu_{1,k}\}, \text{ and} \quad \text{[Equation 220]}$$

$$\delta_{k,n} = t_{k,n} - (t_{0,n} + D_{b,n} + W_{k,n}),$$

$$\alpha_k = \delta_{k,n} \quad \text{[Equation 221]}$$

According to another aspect, in the method of scheduling the underwater wireless mobile network, the estimated time value $p_k$ at which the sink node starts receiving the data packet of the k-th node when the k-th node transmits the data packet with the round trip time $\hat{\delta}_{k,n}$ as soon as the beacon packet is received may be calculated as [Equation 208] below, wherein, when $p_k > e_{k-1}$, the round trip time of the k-th node is estimated as [Equation 210] below by solving [Equation 209] below, and $X_{k,n}$ in the [Equation 210] is as [Equation 211] below, $$p_k = t_{0,n} + D_{b,n} + \hat{\delta}_{k,n}, \quad \text{[Equation 208]}$$

$$\hat{\delta}_{k,n} = \delta_{k,n-1} + X_{k,n}(\hat{t}_{k,n} - t_{k,n-1})$$

$$\hat{t}_{k,n} = t_{0,n} + D_{b,n} + \hat{\delta}_{k,n}, \text{ and} \quad \text{[Equation 209]}$$

$$\hat{\delta}_{k,n} = \frac{1}{1 - X_{k,n}}(\delta_{k,n-1} + X_{k,n}(t_{0,n} + D_{b,n} - t_{k,n-1})). \quad \text{[Equation 210]}$$

According to another aspect to solve the above object, the present invention provides a method of scheduling for a underwater wireless mobile network, wherein the method is performed for a network topology using a time division multiple access method and configured with one sink node broadcasting a beacon packet including a transmission schedule, and multiple nodes transmitting to the sink node a data packet according to a transmission schedule by receiving the beacon packet of the sink node, the method including: a first step of performing, by the sink node, an initial stage; a second step of determining, by the sink node, a receiving order of a data packet, and setting a time delay $w_{1,n}$ assigned to a first node in an n-th cycle to 0; a third step of estimating, by the sink node, a round trip time $\hat{\delta}_{1,n}$ of the first node in the n-th cycle, and calculating a data packet receiving completion time $e_1$ of the first node; a fourth step of determining, by the sink node, whether or not a parameter (k) is smaller than a last-th (K-th) parameter; a fifth step of setting, by the sink node, the parameter (k) to k+1 when the parameter (k) is determined to be smaller than the last-th (K-th) parameter in the fourth step; a sixth step of estimating, by the sink node, a round trip time $\hat{\delta}_{k,n}$ of a k-th node in the n-th cycle; a seventh step of calculating, by the sink node, an estimated time value $p_k$ at which the sink node starts receiving a data packet of the k-th node by using the round trip time $\hat{\delta}_{k,n}$ of the k-th node estimated in the sixth step when the k-th node transmits the data packet as soon as the beacon packet is received; an eighth step of calculating a latency $W_{k,n}$ of the k-th node by using the estimated time value $p_k$ at which the sink node starts receiving the data packet of the k-th node and which is calculated in the seventh step; and a ninth step of calculating, by the sink node, an estimated time value $e_k$ at which receiving of the data packet of the k-th node is completed by using the estimated time value $p_k$ at which the sink node starts receiving the data packet of the k-th node and which is calculated in the seventh step, and the latency $W_{k,n}$ of the k-th node calculated in the eighth step, and of performing the fourth step.

According to another aspect, in the method of scheduling the underwater wireless mobile network, when the parameter (k) is determined not to be smaller than the last-th (K-th) parameter in the fourth step, the method may further include a tenth step of determining, by the sink node, whether or not to broadcast a beacon packet, wherein in the tenth step, when the beacon packet is not broadcasted, the sink node ends the scheduling method.

According to another aspect, in the method of scheduling the underwater wireless mobile network, when the beacon packet is broadcasted in the tenth step, the method may further include: a 11-th step of broadcasting, by the sink node, the beacon packet at a time $t_{0,n}$ at which the sink node starts broadcasting a beacon packet in an n-th cycle; a 12-th step of completing receiving of a data packet of a K-th node or waiting until the estimated time value $e_k$ at which receiving of the data packet of the K-th node is completed exceeds; a 13-th step of calculating, by the sink node, a round trip time $\hat{\delta}_{k,n}$ of the k-th node in the n-th cycle, and updating an availability value $u_{m,k}$ of obtaining the round trip time and round trip time related information $\alpha_k$ and $l_k$ which is the most recently obtained; and a 14-th step of increasing, by the sink node, n by 1, and performing the second step.

According to another aspect, in the method of scheduling the underwater wireless mobile network, in the first step, the sink node may perform the initial stage as [Equation 301] below, $$n=1, u_{1,k}=1, l_k=0, \alpha_k=\delta_{k,0}, C_0=C_D u_{m,k}=0. \quad \text{[Equation 301]}$$

[wherein, k is a natural number equal to or smaller than K; m=2, 3, . . . , M; $u_{1,k}$ is a parameter representing an availability of obtaining a round trip time of the round trip time in an (n−1)-th cycle in the n-th cycle; $u_{m,k}$ is a parameter representing an availability of obtaining a round trip time of the k-th node in an (n−m)-th cycle in the n-th cycle; $\alpha_k$ is a round trip time of the k-th node that is the most recently obtained; $l_k$ is a cycle in which $\alpha_k$ is obtained; $\delta_{k,0}$ is an initial round trip time between the sink node and each node; $C_0$ is a duration time before a first cycle; and $C_D$ is estimated as Equation 302 below]

$$C_D = \min\{\delta_{1,0}, \ldots, \delta_{K,0}\} + \sum_{k=1}^{K} D_{k,1} \quad \text{[Equation 302]}$$

[wherein, $D_{k,1}$ is a value obtained by converting a length of a data packet of the k-th node in the first cycle to a time].

According to another aspect, in the method of scheduling the underwater wireless mobile network, in the third step, when a number of times that a round trip time of the first node is successfully obtained is $J_0$ (being natural number equal to or greater than 2) times during M recent cycles, the round trip time $\hat{\delta}_{1,n}$ of the first node in the n-th cycle may be estimated as [Equation 303] below, and the data packet receiving completion time of the first node may be calculated as [Equation 305], $$\hat{\delta}_{1,n}=Q_1(\hat{t}_{1,n})$$

$$\hat{t}_{1,n}=t_{0,n}+D_{b,n}+\hat{\delta}_{1,n} \quad \text{[Equation 303]}$$

[wherein, $Q_1(x)$ is a polynomial equation of minimum order which passes coordinates of $$(t_{1,n-m_1}, \delta_{1,n-m_1}), \ldots, (t_{1,n-m_j}, \delta_{1,n-m_j}), \ldots, (t_{1,n-m_{J_1}}, \delta_{1,n-m_{J_1}});$$

$\hat{t}_{1,n}$ is an estimated value of a time $t_{1,n}$ at which a data packet of the first node in the n-th cycle is received; $t_{0,n}$ is a time at which the sink node starts broadcasting a beacon packet in the n-th cycle; $D_{b,n}$ is a value obtained by converting a length of a beacon packet in the n-th cycle to a time; and $\hat{\delta}_{1,n}$ is limited as Equation 304 below]

$$\hat{\delta}_{1,n}=\min\{\delta_{max}, \hat{\delta}_{1,n}\} \quad \text{[Equation 304]}$$

[wherein, $\delta_{max}$ is a maximum value of a round trip time], $$e_1=t_{0,n}+D_{b,n}+\hat{\delta}_{1,n}+D_{1,n}+\tau_g \quad \text{[Equation 305]}$$

[wherein, $D_{1,n}$ is a value obtained by converting a length of a data packet of the first node in the n-th cycle to a time; and $\tau_g$ is a guard time].

According to another aspect, in the method of scheduling the underwater wireless mobile network, the [Equation 303] may be solved by repeating as below, 1) an initial value of $\hat{t}_{1,n}$ is determined as $\hat{t}_{1,n}=t_{0,n}+D_{b,n}+\alpha_1$ or $\hat{t}_{1,n}=t_{0,n}+D_{b,n}+\delta_{max}$;

2) $\hat{\delta}_{1,n}$ is calculated from [Equation 303] by using the initial value $\hat{t}_{1,n}$ as $\hat{\delta}_{1,n}=Q_1(\hat{t}_{k,n})$, 3) $\hat{t}_{1,n}$ is calculated by using $\hat{\delta}_{1,n}$ calculated in 2) as $\hat{t}_{1,n}=t_{0,n}+D_{b,n}+\hat{\delta}_{1,n}$, 4) $\hat{\delta}_{1,n}$ is calculated from $\hat{t}_{1,n}$ calculated in 3) as $\hat{\delta}_{1,n}=Q_1(\hat{t}_{1,n})$, 5) $\hat{t}_{1,n}$ is calculated by using $\hat{\delta}_{1,n}$ calculated in 4) as $\hat{t}_{1,n}=t_{0,n}+D_{b,n}+\hat{\delta}_{1,n}$, and 6) $\hat{\delta}_{1,n}$ is calculated from $\hat{t}_{1,n}$ calculated in 5) as $\hat{\delta}_{1,n}=Q_1(\hat{t}_{1,n})$ are repeated for a preset times, and finally calculated values are determined as $\hat{\delta}_{1,n}$ and $\hat{t}_{1,n}$ (wherein, a number of repetition times is not determined, a method of stopping repetition when a difference between previously calculated $\hat{\delta}_{1,n}$ and currently calculated $\hat{\delta}_{1,n}$ is equal to or smaller than a predetermined value or a method of stopping repetition when a difference between previously calculated $\hat{t}_{1,n}$ and currently calculated $\hat{t}_{1,n}$ is equal to or smaller than a predetermined value is used).

According to another aspect, in the method of scheduling the underwater wireless mobile network, in the third step, when a number of times that a round trip time of the first node is successfully obtained is smaller than $J_0$ times during M recent cycles, the round trip time $\hat{\delta}_{1,n}$ of the first node in the n-th cycle may be estimated, and the data packet receiving completion time $e_1$ of the first node may be calculated as [Equation 306] below, $$\hat{\delta}_{1,n}=\min\{\max,\alpha_1+2v_{max}C_{n-1}(n-l_1)/c_{min}\}$$

$$e_1=t_{0,n}+D_{b,n}+\hat{\delta}_{1,n} \qquad \text{[Equation 306]}$$

[wherein, $\alpha_1$ is a round trip time of the first node which is the most recently obtained, $v_{max}$ is a maximum relative velocity between the sink node and the k-th node, $C_{n-1}$ is a duration time of an (n−1)-th cycle, $l_1$ is the most recent cycle in which a round trip time of the first node is obtained, and $c_{min}$ is a minimum value of an underwater sound wave transfer velocity].

According to another aspect, in the method of scheduling the underwater wireless mobile network, in the sixth step, when a number of times that a round trip time of the k-th node is successfully obtained is equal to or greater than $J_0$ times during M recent cycles, the round trip time $\hat{\delta}_{k,n}$ of the k-th node in the n-th cycle may be estimated as [Equation 307] below, $$\hat{\delta}_{k,n}=Q_k(e_{k-1}) \qquad \text{[Equation 307]}$$

[wherein, $Q_k(x)$ is a polynomial equation of minimum order which passes coordinates of $$(t_{k,n-m_1}, \delta_{k,n-m_1}), \ldots, (t_{k,n-m_j}, \delta_{k,n-m_j}), \ldots, (t_{k,n-m_{J_k}}, \delta_{k,n-m_{J_k}});$$

$$\delta_{k,n-m_j}$$

is a valid value of round trip time of the k-th node in an (n−$m_j$) cycle; and $e_{k-1}$ is an estimated value of a time at which the sink node completes receiving a data packet of a (k−1)-th node].

According to another aspect, in the method of scheduling the underwater wireless mobile network, in the sixth step, the estimated time value $p_k$ at which the sink node starts receiving the data packet of the k-th node when the k-th node transmits the data packet as soon as the beacon packet is received with the round trip time $\hat{\delta}_{k,n}$ may be calculated as [Equation 308] below, $$p_k=t_{0,n}+D_{b,n}+\hat{\delta}_{k,n}. \qquad \text{[Equation 308]}$$

According to another aspect, in the method of scheduling the underwater wireless mobile network, in the sixth step, when $p_k > e_{k-1}$, the round trip time $\hat{\delta}_{k,n}$ n of the k-th node in the n-th cycle may be estimated as [Equation 309] below, $$\hat{\delta}_{k,n}=Q_k(\hat{t}_{k,n})$$

$$\hat{t}_{k,n}=t_{0,n}+D_{b,n}+\hat{\delta}_{k,n} \qquad \text{[Equation 309]}$$

According to another aspect, in the method of scheduling the underwater wireless mobile network, the [Equation 309] may be solved by repeating as below, 1') an initial value of $\hat{t}_{k,n}$ is determined as $\hat{t}_{k,n}=t_{0,n}+D_{b,n}+\alpha_k$ or $\hat{t}_{k,n}=t_{0,n}+D_{b,n}+\delta_{max}$, 2') $\hat{\delta}_{k,n}$ is calculated from [Equation 309] by using the initial value of $\hat{t}_{k,n}$ as $\hat{\delta}_{k,n}=Q_k(\hat{t}_{k,n})$, 3') $\hat{t}_{k,n}$ is calculated by using the calculated $\hat{\delta}_{k,n}$ as $\hat{t}_{k,n}=t_{0,n}+D_{b,n}+\hat{\delta}_{k,n}$, 4') $\hat{\delta}_{k,n}$ is calculated from $\hat{t}_{k,n}$ calculated in 3') as $\hat{\delta}_{k,n}=Q_k(\hat{t}_{k,n})$, 5') $\hat{t}_{k,n}$ is calculated by using $\hat{\delta}_{k,n}$ calculated in 4') as $\hat{t}_{k,n}=t_{0,n}+D_{b,n}+\hat{\delta}_{k,n}$, and 6') $\hat{\delta}_{k,n}$ is calculated from $\hat{t}_{k,n}$ calculated in 5') as $\hat{\delta}_{k,n}=Q_k(\hat{t}_{k,n})$ are repeated for a preset number of times, and finally calculated values are determined as $\hat{\delta}_{k,n}$ and $\hat{t}_{k,n}$ (wherein, a number of repetition times is not determined, and a method of stopping repetition when a difference between previously calculated $\hat{\delta}_{k,n}$ and currently calculated $\hat{\delta}_{k,n}$ is equal to or smaller than a predetermined value or a method of stopping repetition when a difference between previously calculated $\hat{t}_{k,n}$ and currently calculated is equal to or smaller than a predetermined value is used).

According to another aspect, in the method of scheduling the underwater wireless mobile network, $\hat{\delta}_{k,n}$ may be limited to have a value as [Equation 310] below, $$\hat{\delta}_{k,n}=\min\{\delta_{max},\hat{\delta}_{k,n}\} \qquad \text{[Equation 310]}$$

According to another aspect, in the method of scheduling the underwater wireless mobile network, in the sixth step, when a number of times that a round trip time of the k-th node is successfully obtained is smaller than $J_0$ times during M recent cycles, the round trip time $\hat{\delta}_{k,n}$ of the k-th node in the n-th cycle may be estimated as [Equation 311] below, $$\hat{\delta}_{k,n}=\max\{0,\alpha_k-2v_{max}C_{n-1}(n-l_k)/c_{min}\}. \qquad \text{[Equation 311]}$$

According to another aspect, in the method of scheduling the underwater wireless mobile network, in the seventh step, the estimated time value $p_k$ at which the sink node starts receiving the data packet of the k-th node may be calculated as [Equation 308] below, $$p_k=t_{0,n}+D_{b,n}+\hat{\delta}_{k,n}. \qquad \text{[Equation 308]}$$

According to another aspect, in the method of scheduling the underwater wireless mobile network, in the eighth step, the latency $W_{k,n}$ of the k-th node may be calculated as [Equation 312] below, $$w_{k,n}=\max\{0,e_{k-1}-p_k\} \qquad \text{[Equation 312]}$$

According to another aspect, in the method of scheduling the underwater wireless mobile network, in the ninth step, when a number of times that a round trip time of the k-th node is successfully obtained is equal to or greater than $J_0$ times during M recent cycles, the estimated time value $e_k$ at which the sink node completes receiving the data packet of the k-th node may be calculated as [Equation 313] below, $$e_k=p_k+D_{k,n}+w_{k,n}+\tau_g \qquad \text{[Equation 313]}$$

[wherein, $D_{k,n}$ is a value obtained by converting a length of a data packet of the k-th node in the n-th cycle to a time].

According to another aspect, in the method of scheduling the underwater wireless mobile network, in the ninth step, when a number times that a round trip time of the first node is successfully obtained is smaller than $J_0$ times during M recent cycles, the estimated time value $e_k$ at which the sink node completes receiving the data packet of the k-th node may be calculated as [Equation 314] below, $$e_k=t_{0,n}+D_{b,n}+w_{k,n}+\min\{\delta_{max},\alpha_k+2v_{max}C_{n-1}(n-l_k)/c_{min}\}+D_{k,n}. \qquad \text{[Equation 314]}$$

According to another aspect, in the method of scheduling the underwater wireless mobile network, in the 13-th step, in order to update the availability value $u_{m,k}$ of obtaining the round trip time, the availability value $u_{m,k}$ of obtaining the round trip time may be updated for all nodes as [Equation 315] below, when the data packet of the k-th node in the n-th cycle is successfully received, [Equation 316] below is performed, when the data packet of the k-th node in the n-th cycle is not successfully received, [Equation 317] below is performed, the round trip time related information ($l_k$) that is the mostly recently obtained is updated as [Equation 318] below, and when the availability value $u_{1,k}$ of obtaining the round trip time is 1, the round trip time $\delta_{k,n}$ of the k-th node in the n-th cycle is calculated and the round trip time related information $\alpha_k$ that is the most recently obtained is updated as [Equation 319] below, $$u_{m+1,k} = u_{m,k},\quad \text{[Equation 315]}$$

$$u_{1,k} = 1,\quad \text{[Equation 316]}$$

$$u_{1,k} = 0,\quad \text{[Equation 317]}$$

$$l_k = \max\{l_k, n u_{1,k}\},\text{ and}\quad \text{[Equation 318]}$$

$$\delta_{k,n} = t_{k,n} - (t_{0,n} + D_{b,n} + w_{k,n}),$$

$$\alpha_k = \delta_{k,n}.\quad \text{[Equation 319]}$$

Advantageous Effects

According to an embodiment of the present invention, in a method of scheduling for an underwater wireless mobile network, a sink node broadcasts an initial packet to multiple nodes, and receives an initial response packet from the multiple nodes for a first set time $T_{init}$; the sink node calculates a round trip time $RTT_H$ between the sink node and the multiple nodes from the received initial response packet; the sink node determines whether or not a collision occurs when receiving the initial response packet; if not, the sink node sorts the nodes in ascending order of the round trip time by using calculated round trip times $RTT_H$; the sink node sets a parameter k to 1, and sets a latency $w_{1,1}$ of a first node to "0"; the sink node calculates a maximum time value $t_{1,1}^{max}$ at which the sink node starts receiving a data packet of the first node, determines whether or not the parameter k is smaller than the last-th (K-th) parameter, and if so, sets the parameter k to k+1; the sink node calculates a minimum time value $t_{k,1}^{min}$ at which the sink node receives a data packet of a k-th node; the sink node calculates a latency $w_{k,1}$ of the k-th node; the sink node calculates a maximum time value $t_{k,1}^{max}$ at which the sink node receives the data packet of the k-th node, and determines whether or not the parameter k is smaller than the last-th (K-th); if not, the sink node broadcasts a first beacon packet to the multiple nodes for a third set time $t_{0,1}$; the sink node received a data packet of the last-th (K-th) node or waits for a fourth set time $t_{K,1}^{max}+D_{K,1}$ after broadcasting the first beacon packet; the sink node calculates a round trip time $\delta_{k,n}$ between the sink node and the k-th node; sink node sorts the nodes in ascending order of round trip time by using calculated round trip times $\delta_{k,n}$; the sink node calculates a round trip time variation $\lambda_{max}$ of the node which is variable during one cycle, and sets the parameter k to 1; the sink node sets a time delay $W_{1,n}$ assigned to the first node in an n-th cycle to "0", calculates a maximum time value $t_{1,n}^{max}$ at which receiving of a data packet of the first node in the n-th cycle starts, determines whether or not the parameter k is smaller than the last-th (K-th) parameter, and if so, sets the parameter (k) to k+1; the sink node calculate a minimum time value $t_{k,n}^{min}$ at which receiving of a data packet of the k-th node in the n-th cycle starts; the sink node calculates a time delay $W_{k,n}$ assigned to the k-th node in the n-th cycle; the sink node calculates a maximum time value $t_{k,n}^{max}$ at which receiving of a data packet of the k-th node in the n-th cycle starts, determines whether or not parameter (k) is smaller than the last-th (K-th) parameter; and if not, the sink node determines whether or not to broadcast a beacon packet, and when a beacon packet is not broadcasted, the scheduling method is ended. Therefore, the method is capable of, first, operating regardless of navigation information of a mobile node underwater, second, improving network throughput since additional packet exchanging is not required for time synchronization as time synchronization is not required, third, accurately operating even though local start information of each node is different since schedule information is determined by information corresponding to a temporal difference rather than an absolute time, and fourth, not requiring re-initialization since, for schedule information, an error is not accumulated as times goes on as an accurate value of round trip time information between the sink node and the node is calculated at the end of each cycle.

In addition, according to another embodiment of the present invention, in a method of scheduling for an underwater wireless mobile network, a sink node performs an initial stage; the sink node determines a receiving order of a data packet and sets a time delay $w_{1,n}$ assigned to a first node in an n-th cycle to 0; the sink node estimates a round trip time $\hat{\delta}_{1,n}$ of the first node in the n-th cycle, and calculates a data packet receiving completion time $e_1$ of the first node; the sink node determines whether or not a parameter (k) is smaller than the last-th (K-th); if so, the sink node set the parameter (k) to k+1; the sink node estimates a round trip time $\hat{\delta}_{1,n}$ of a k-th node in the n-th cycle; the sink node calculates an estimated value $p_k$ of a time at which the sink node starts receiving a data packet of the k-th node by using the estimated round trip time $\hat{\delta}_{1,n}$ of the k-th node when the k-th node transmits the data packet as soon as a beacon packet is received; the sink node calculates a latency $W_{k,n}$ of the k-th node by using the calculated estimated value $p_k$ of a time at which the sink node starts receiving the data packet of the k-th node; and the sink node calculates an estimated value $e_k$ of a time at which receiving of the data packet of the k-th node is completed by suing the calculated estimated value $p_k$ of a time at which the sink node starts receiving the data packet of the k-th node, and the calculated latency $W_{k,n}$ of the k-th node, and performs a determination step.

In other words, under an network environment where a round trip time is long and a transmission velocity is slow such as in an underwater sound wireless mobile network, etc., when multiple nodes transmit to the sink node a data packet by using a time division multiple access method, a round trip time due to the mobility of a node is tracked in a cycle unit, and thus an idle time is minimized when the sink node receives a data packet from the nodes. Particularly, when a number of nodes increases, network efficiency increases more. The method of scheduling for the underwater wireless mobile network according to the present invention uses information corresponding to a time difference rather than an absolute time basis so that the method is accurately operated even though local time information of each node is different. Accordingly, time synchronization is not required, and thus the method is applicable to the field in which many resources are consumed for time synchronization.

In addition, an accurate value of round trip time information is obtained for each cycle, and thus an error is not accumulated and periodical re-initialization is not required.

According to another embodiment of the present invention, in a method of scheduling for an underwater wireless mobile network, a sink node performs an initial stage; the sink node determines a receiving order of a data packet receive, and sets a time delay $w_{1,n}$ assigned to a first node in an n-th cycle to 0; the sink node estimates a round trip time $\hat{\delta}_{1,n}$ of the first node in the n-th cycle, and calculates a data packet receiving completion time $e_1$ of the first node; the sink node determines whether or not a parameter k is smaller than the last-th (K-th) parameter; if so, the sink node set the parameter k to k+1; the sink node estimates a round trip time $\hat{\delta}_{k,n}$ of a k-th node in the n-th cycle; the sink node calculates an estimated value $p_k$ of a time at which the sink node starts receiving a data packet of the k-th node by using the estimated round trip time $\hat{\delta}_{k,n}$ of the k-th node when the k-th node transmits the data packet as soon as a beacon packet is received; the sink node calculates a latency $W_{k,n}$ of the k-th node by using the calculated estimated value $p_k$ of a time at which the sink node starts receiving the data packet of the k-th node; the sink node calculates an estimated value $e_k$ of a time at which receiving of the data packet of the k-th node is completed by using the calculated estimated value $p_k$ of a time at which the sink node starts receiving the data packet of the k-th node and the calculated latency $W_{k,n}$ of the k-th node, and performs a determination step.

In other words, under a network environment where a round trip time is long and a transmission velocity is slow such as in an underwater sound wireless mobile network, etc., network efficiency according to channel usage efficiency may be improved. In addition, time synchronization is not required, and thus the method finds application in the field in which time synchronization is not available or many resources are consumed for time synchronization. Further, an error is not accumulated and periodic re-initialization is not required. Particularly, when a number of nodes increases, network efficiency increases more. In the underwater network scheduling method using a polynomial equation interpolation method according to the present invention, information corresponding to a time difference is used rather than an absolute time basis, and thus the method is accurately operated even though local time information of each node is different. Accordingly, time synchronization is not required, and thus the method finds application in the field in which time synchronization is not available many resources are consumed for time synchronization.

In addition, since an accurate value of round trip time information is obtained in each cycle, an error is not accumulated and periodic re-initialization is not required.

DESCRIPTION OF DRAWINGS

FIG. 1 is a view showing a network topology to which a method of scheduling for an underwater wireless mobile network according to a first embodiment of the present invention is applied.

FIG. 2a to FIG. 2f are views showing flowcharts illustrating a method of scheduling for an underwater wireless mobile network according to the first embodiment of the present invention.

FIG. 3 is a view showing a conceptual scheduling diagram in a cycle unit according to the first embodiment of the present invention.

FIG. 4 is a view showing a conceptual diagram of deriving a latency of each node in an n-th cycle according to the first embodiment of the present invention.

FIG. 5 is a view showing a network topology to which a method of scheduling for an underwater wireless mobile network according to a second embodiment of the present invention is applied.

FIG. 6 is a view showing a conceptual cycle diagram of a method of scheduling for an underwater wireless mobile network according to the second embodiment of the present invention.

FIGS. 7a to 7c are views showing flowcharts illustrating a method of scheduling for an underwater wireless mobile network according to the second embodiment of the present invention.

FIG. 8 is a view showing a network topology to which a method of scheduling for an underwater wireless mobile network according to a third embodiment of the present invention is applied.

FIG. 9 is a view showing a conceptual cycle diagram of a method of scheduling for an underwater wireless mobile network according to the third embodiment of the present invention.

FIG. 10a to FIG. 10c are views showing flowcharts illustrating a method of scheduling for an underwater wireless mobile network according to the third embodiment of the present invention.

MODE FOR INVENTION

Hereinafter, an embodiment of the present invention will be described with reference to drawings.

First Embodiment

FIG. 1 is a view showing a network topology to which a method of scheduling for an underwater wireless mobile network according to a first embodiment of the present invention is applied, the network topology being configured with one sink node and multiple nodes. In a scheduling method used in a centralized network topology, multiple nodes transmit data packets to one sink node by using sound waves in underwater. Nodes other than a sink node are simply called a node. The sink node broadcasts a beacon packet including a transmission schedule of the nodes, and the nodes having received the beacon packet transmit to the sink node a data packet according to a transmission schedule of each node which is indicated in the beacon packet. It is assumed that a maximum relative velocity between the sink node and the node is provided, and is represented as "V".

Hereinafter, a method of scheduling for an underwater wireless mobile network according to a first embodiment of the present invention will be described, the method being performed under a network topology configured as above.

FIG. 2a to FIG. 2f are views showing flowcharts illustrating a method of scheduling for an underwater wireless mobile network according to the first embodiment of the present invention, herein S means a step.

A scheduling method of the present invention includes a process of calculating a round trip time (RTT) between a sink node and multiple nodes, performing an initial state of deriving an initial collision avoidance schedule based on the RTT. In addition, the scheduling method includes a process of performing a normal stage that is performed after a first cycle where the sink node broadcasts beacon packets and receiving of a data packet from transmitted from all nodes is completed.

Initial Stage

First, in step S1010, a sink node broadcasts an initial (IRQ) packet to multiple nodes, and in step S1020, the sink node receives an initial response (IRP) packet from multiple nodes for a first set time $T_{init}$.

An initial packet has to include only packet type identification information notifying of being an initial packet when received in a node, and thus has a very short length. An initial response packet includes information of an address of a node transmitting a corresponding response packet, and packet type identification information representing being an initial response packet. When a maximum communication radius of a modem is r, and a velocity of a sound wave is c, the sink node completes receiving an initial response packet from all nodes within the first set time below after broadcasting an initial packet.

The first set time $T_{init}$ is determined as Equation 101 below.

$$T_{init} = RTT_{max} + D_{IRQ} + D_{IRP} + T_{pro} \quad \text{[Equation 101]}$$

Herein, $RTT_{max}$ is a maximum value of a round trip time between the sink node and the node, and is determined as Equation 102 below, $D_{IRQ}$ is a value obtained by converting a length of an initial packet to a time, $D_{IRP}$ is a value obtained by converting a length of an initial response packet to a time, and $T_{pro}$ is a time taken to, by a node, transmit an initial response packet after receiving an initial packet]

$$RTT_{max} = 2r/c \quad \text{[Equation 102]}$$

[Herein, r is a maximum communication radius of a modem, and c is a velocity of a sound wave]

Then, in step S1030, the sink node calculates a round trip time $RTT_H$ between the sink node and multiple nodes from the initial response packet received in the step S1020. In detail, the sink node may determine an initial packet transmission time $t_{IRQ}$ from its own local clock, and determine an initial response packet receiving time $t_{IRP}(H)$ received from a node (H) from its own local clock. Accordingly, the sink node may obtain round trip time information $RTT_H$ between the sink node and the node H from a difference between an initial response packet receiving time and an initial packet transmission time without performing temporal synchronization.

A round trip time $RTT_H$ between the sink node and multiple nodes is determined as Equation 103 below.

$$RTT_H = t_{IRP}(H) - t_{IRQ} - T_{pro} - D_{IRQ} \quad \text{[Equation 103]}$$

Then, in step S1040, the sink node determines whether or not a collision occurs while receiving an initial response packet.

When the sink node receives an initial response (IRP) packet from nodes, the sink node receives an initial response packet from various nodes. Herein, when a round trip time difference between the sink node and each node is longer than a length of an initial response packet, collision does not occur. For example, when a transmission velocity of a physical layer is 100 kbps and a transmission velocity of a sound wave is 1,500 m/s, assuming that a length of one bit is 0.01 ms, and an initial response packet includes information of an address and a packet type of a node and thus has 30 bits, herein, a length of the initial response packet is 0.3 ms. Herein, a sound wave moves a distance of 0.45 m during 0.3 ms, and when a relative difference of a distance between the sink node and the node for arbitrary two nodes is equal to or greater than 0.5 m, collision does not occur, and thus collision probability becomes very small. This means that natural random back-off effect generated by a slow transmission velocity of a sound wave is used. In general, in a wireless network using electromagnetic waves in the air, in order to prevent collision of a packet while receiving, a random time delay is assigned. However, in a wireless communication network using a sound wave underwater, a principle of naturally inducing a random time delay by a slow transmission velocity of a sound wave is used. Nonetheless, collision may occur while receiving in a sink node for an initial response packet, thus the major feature of the initial stage of the present invention is to selectively apply collision avoidance while receiving an initial response packet to nodes where such collision occurs when receiving an initial response packet.

By performing broadcasting of an initial packet at first and receiving an initial response packet from nodes in response to the broadcasting, the sink node may determine whether or not a collision occurs when receiving an initial response packet by determining whether or not a case is present where a signal has been received in a physical layer but information thereof has not been correctly reconstructed.

In step S1040, when a collision does no occur when receiving an initial response packet (N), step S1050 below is performed as an initial scheduling process. Meanwhile, when a collision occurs when receiving an initial response packet (Y), step S1260 of obtaining, by the sink node, a round trip time through collision avoidance whereby a re-initial (RIRP) packet is broadcasted to multiple nodes is performed.

A re-initial (RIRP) packet includes a list of nodes where a round trip time between the sink node and a node is obtained, and the nodes having received the re-initial packet check whether not being present in the list of the re-initial packet, and if not, the nodes transmit a re-initial response packet to the sink node through random back-off. Herein, random back-off means delaying transmission of a re-initial response packet by an arbitrary integer multiple of a time slot having a length of $T_{back}$ rather than transmitting a re-initial response packet as soon as the node having received a re-initial packet receives an re-initial packet. In other words, the node having received a re-initial packet waits for a time of $T_{RIRP}$ calculated as Equation 104 below after having received a re-initial packet, and then transmits re-initial response packet to the sink node.

$$W_{RIRP} = mT_{back} \quad \text{[Equation 104]}$$

[Herein, m is integer not being a negative number randomly selected from integers smaller than a maximum value (M) assigned by a user. Preferably, $T_{back}$ has to be equal to or greater than by two times than a length of an initial response packet.]

Then, in step S1270, the sink node receives a re-initial response packet for a second set time $T_{reinit}$. The re-initial response packet includes information included in an initial response packet, and an m value additionally.

In other words, the sink node, similar to receiving an initial response packet, completes receiving a re-initial response packet from all nodes within a second set time $T_{reinit}$ determined as Equation 105 below after broadcasting a re-initial packet.

$$T_{reinit} = RTT_{max} + D_{RIRQ} + D_{RIRP} + T_{pro} \quad \text{[Equation 105]}$$

[Herein, $D_{RIRQ}$ is a value obtained by converting a length of a re-initial packet length to a time, and $D_{RIRP}$ is a value obtained by converting a length of a re-initial response packet length to a time]

Then, in step S1280, the sink node calculates a round trip time $RTT_H$ between the sink node and multiple nodes from the re-initial response packet received in step S1270.

In detail, the sink node may determine a re-initial packet transmission time $t_{RIRQ}$ from its own local clock, and determine a receiving time $t_{RIRP}(H)$ of a re-initial response packet received from a node (H) from its own local clock. Accordingly, the sink node may obtain round trip time information $RTT_H$ between the sink node and the node (H) from a difference between an re-initial response packet receiving time and an re-initial packet transmission time as Equation 106 below without performing temporal synchronization.

$$RTT_H = t_{RIRP}(H) - t_{RIRQ} - T_{pro} - D_{RIRQ} \quad \text{[Equation 106]}$$

[Herein, $t_{RIRP}(H)$ is a receiving time of a re-initial response packet received from the node H, and $t_{RIRQ}$ is a transmission time of the re-initial packet.]

Then, in step S1290, the sink node determines whether or not a collision occurs when receiving a re-initial response packet.

When a collision occurs when receiving a re-initial response packet (Y) in step S1290, step S1260 is performed. Meanwhile, when a collision does no occur when receiving a re-initial response packet (N) in step S1290, step S1050 is performed.

In other words, a round trip time between the sink node and the node for all nodes is obtained by repeating broadcasting of a re-initial packet until collision does not occur when receiving a re-initial response packet. However, when obtaining a round trip time between the sink node and the node for all nodes is not required, the above number of repetition times may be limited.

When the sink node completes obtaining round trip time information during the initial stage as above, the sink node calculates an initial schedule by using the round trip time information obtained as above so that collision does not occur when receiving a data packet of nodes in the sink node. The sink node generates a beacon packet including schedule information, and broadcasts the same to all nodes.

For this, in step S1050, the sink node sorts the nodes in ascending order of round trip time by using the round trip times $RTT_H$ calculated in step S1030.

When K nodes are present in total, a node having a k-th lowest round trip time is designated as "k-th node". A round trip time of the k-th node is represented as $\delta_{k,1}$. $\delta_{k,1}$ is a value obtained by sorting round trip times in ascending order which are obtained from Equation 103 and Equation 106. A time at which $\delta_{k,1}$ is obtained is represented as $\tau_k$. $\tau_k$ is a $t_{IRP}$ or $t_{RIRP}$ value corresponding to $\delta_{k,1}$. A time at which the sink node broadcasts the first beacon packet is represented as $t_{0,1}$. $t_{0,1}$ is a value obtained from a local clock of the sink node.

Then, the sink node performs scheduling of each node in ascending order of round trip time as follows. Scheduling means a latency for transmitting a data packet after the node receives a beacon packet, and a latency of the k-th node is represented as $w_{k,1}$.

First, in step S1060, the sink node sets a parameter k to 1, and a latency of a first node $w_{1,1}$ is set to "0" as Equation 107 below. In other words, the first node transmits a data packet without latency as soon as a beacon packet is received.

$$w_{1,1} = 0 \quad \text{[Equation 107]}$$

Then, in step S1070, the sink node calculates a maximum time value $t_{1,1}^{max}$ at which the sink node starts receiving a data packet of the first node is calculated as Equation 108 below.

$$t_{1,1}^{max} = t_{0,1} + D_b + T_{pro} + \delta_{1,1} + \{t_{0,1} + RTT_{max}/2 + D_b + T_{pro} - (\tau_1 - \delta_{1,1}/2)\} \times 2 \times V/c \quad \text{[Equation 108]}$$

[Herein, $t_{0,1}$ is a time at which the sink node broadcasts the first beacon packet, $D_b$ is a value obtained by converting a length of a beacon packet to a time, $\delta_{1,1}$ is a round trip time of the first node, $\tau_1$ is a time at which the round trip time between the first node and the sink node is obtained, and V is a maximum relative velocity between the sink node and the node.]

In Equation 108, there is considered a maximum variation of a round trip time of the first node which is generated by the mobility of the first node from a time at which the round trip time of the first node is obtained to a time at which the first node transmits a data packet after receiving a beacon packet. The time at which the round trip time of the first node is obtained is $\tau_1$, a time at which the round trip time of the first node is determined is $\tau_1 - \delta_{1,1}/2$, and the first node certainly receives a beacon message before a time $t_{0,1} + RTT_{max}/2$. Accordingly, the round trip time maximally increases when the first node becomes far away from the sink node in a maximum relative velocity V from the time at which the round trip time of the first node is determined to the time at which the first node starts transmitting a data packet. The above is represented as $\{t_{0,1} + RTT_{max}/2 + T_{pro} + D_b - (\tau_1 - \delta_{1,1}/2)\} \times 2 \times V/c$ in Equation 108.

Accordingly, a maximum time value at which the sink node completes receiving a data packet of the first node is as Equation 109 below. In other words, at the maximum time value, receiving is ended.

$$t_{1,1}^{max} + D_{1,1} \quad \text{[Equation 109]}$$

[Herein, $D_{1,1}$ is a value obtained by converting a length of a data packet of the first node to a time]

$t_{1,1}^{max}$ is a maximum time value at which the sink node receives a data packet of the first node. Accordingly, even if the sink node is able to receive a data packet of a second node at first, assigning a latency is the main idea of avoiding collision when the sink nodes receives a data packet from nodes so that the sink node completes receiving the data packet of the first node, and starts receiving the data packet of the second node. A case where the sink node receives the data packet of the second node at first is a case where the second nodes moves in a direction opposite to a direction of which the sink node moves in a maximum velocity. That is, when the second node becomes far away from the sink node in a maximum velocity, and even though the second node transmit the data packet after receiving a beacon packet without a time delay, the sink node, the sink node start receiving the data packet of the second node at the earliest time given by Equation 110 below.

Receiving of a data packet of a second node starts after $r_{2,1}^{min}$.

$$t_{2,1}^{min} = t_{0,1} + D_b + T_{pro} + \delta_{2,1} - \{t_{0,1} + RTT_{max}/2 + D_b + T_{pro} - (\tau_2 - \delta_{2,1}/2)\} \times 2 \times V/c \quad \text{[Equation 110]}$$

[Herein, $t_{2,1}^{min}$ is a minimum time value at which the sink node receives a data packet of the second node.]

Accordingly, when a time delay is assigned to a second node as Equation 111 below, collision with a data packet of the first node when receiving a data packet may be prevented in the sink node.

$$w_{2,1} = \max\{0, t_{1,1}^{max} + D_{1,1} - t_{2,1}^{min}\} \quad \text{[Equation 111]}$$

[Herein, max{A,B} is a function of selecting a large value between A and B.]

Similarly, a time delay of each node may be recursively calculated until a time delay of a K-th node is calculated. In detail, a maximum time value $t_{k-1,1}^{max}$ at which the sink node receives a data packet of a (k−1)-th node may be calculated as Equation 112 below.

$$t_{k-1,1}^{max} = t_{0,1} + D_b + T_{pro} + w_{k-1,1} + \delta_{k-1,1} + \{t_{0,1} + RTT_{max}/2 + D_b + T_{pro} + w_{k-1,1} - (\tau_{k-1} - \delta_{k-1,1}/2)\} \times 2 \times V/c \quad \text{[Equation 108]}$$

In step S1080, whether or not the parameter k is smaller than the last-th (K-th) parameter is determined.

In step S1090, when the parameter k is smaller than the last-th (K-th) parameter (Y) in step S1080, the parameter k is set to k+1.

In step S1100, a minimum time value $t_{k,1}^{min}$ at which the sink node receives a data packet of the k-th node may be calculated as Equation 113 below.

$$t_{k,1}^{min} = t_{0,1} + D_b + T_{pro} + \delta_{k,1} + \{t_{0,1} + RTT_{max}/2 + D_b + T_{pro} - (\tau_k - \delta_{k,1}/2)\} \times 2 \times V/c \quad \text{[Equation 108]}$$

[Herein, $\delta_{k,1}$ is a round trip time of the k-th node, and $\tau_k$ is a time at which $\delta_{k,1}$ is obtained.]

In step S1110, the sink node calculates a latency $w_{k,1}$ of the k-th node as Equation 114 below.

$$w_{k,1} = \max\{0, t_{k-1,1}^{max} + D_{k-1,1} - t_{k,1}^{min}\} \quad \text{[Equation 114]}$$

As described above, when a latency $w_{k,1}$ is assigned to the k-th node, a collision between a data packet of the (k-1)-th node and a data packet of the k-th node in the sink node may be avoided when in the sink node when receiving.

In step S1120, the sink node calculates a maximum time value $t_{k,1}^{max}$ at which the sink node receives a data packet of the k-th node as Equation 112, and step S1080 is performed.

Meanwhile, when the parameter k is not smaller than the last-th (K-th) parameter (N) in step S1080, that is, step S1130 is performed when scheduling calculation is completed for all K nodes.

In step S1130, the sink node broadcasts a first beacon packet to nodes for a third set time $t_{0,1}$.

In step S1140, the sink node waits for a fourth set time $t_{K,1}^{max} + D_{K,1}$ after receiving a data packet of the last-th (K-th) node or after broadcasting the first beacon packet, and then a normal stage is performed.

Normal Stage

FIG. 3 is a view showing a conceptual scheduling diagram in a cycle unit according to the first embodiment of the present invention. When a first cycle is defined as a time from at which a sink node broadcasts a beacon packet to at which the sink node completes receiving a data packet from all nodes in an initial stage, a normal stage is from a second cycle. Herein, an n-th cycle means, as shown in FIG. 3, a time from when the sink node broadcasts an n-th beacon packet to when the sink node completes receiving a data packet from all nodes. A time at which a beacon packet of the n-th cycle is broadcasted is represented as $t_{0,n}$. A time at which receiving a data packet of the k-th node starts in the n-th cycle is represented as $t_{k,n}$. In the n-th cycle, a delay time assigned to the k-th node is represented as $w_{k,n}$.

When the n-th cycle is ended, in step S1150, the sink node calculates a round trip time $\delta_{k,n}$ between the sink node and the k-th node as Equation 115 below.

$$\delta_{k,n} = t_{k,n} - w_{k,n} - t_{0,n} - D_{b,n} \quad \text{[Equation 115]}$$

[Herein, $t_{0,n}$ is a time at which a beacon packet of the n-th cycle is broadcasted, $t_{k,n}$ is a time at which receiving of a data packet of the k-th node starts in the n-th cycle, $w_{k,n}$ is a time delay assigned to the k-th node in the n-th cycle, and $D_{b,n}$ is a value obtained by converting a beacon length to a time in the n-th cycle.]

In step S1152, the sink node sorts the nodes in ascending order of round trip time by using round trip times $\delta_{k,n}$ calculated in step S1150.

In step S1154, the sink node calculates a round trip time variation $\lambda_{max}$ of a node which is variable during one cycle as Equation 116 below.

$$\lambda_{max} = 2 \times V \times (t_{0,n} - t_{0,n-1})/c \quad \text{[Equation 116]}$$

[Herein, $t_{0,n-1}$ is a time at which receiving a data packet starts in an (n−1)-th cycle.]

The sink node may obtain a round trip time value between the sink node and each node by using a time at which a beacon packet of an (n−1)-th cycle is transmitted and a time at which a data packet is received from each node. However, in the n-th cycle, a round trip time between the sink node and each node is not accurately obtained due to the mobility of the node at a time when each node transmits a data packet. In the present invention, a difference between a time at which receiving a data packet of each node starts in an (n−1)-th cycle and a time at which a data packet is received in an n-th cycle may be approximated as Equation 117 below, $$t_{k,n} - t_{k,n-1} \approx t_{0,n} - t_{0,n-1}, 1 \leq k \leq K \quad \text{[Equation 117]}$$

and a round trip time variation between the sink node and each node which may vary during one cycle is calculated as Equation 116. In Equation 117, n-th scheduling information is broadcasted by being included in a beacon packet in the n-th cycle, and thus a $t_{k,n}$ value at which an n-th schedule is calculated and derived is unknown value.

FIG. 4 is a view showing a conceptual diagram of deriving a latency of each node in an n-th cycle according to the first embodiment of the present invention. In the n-th cycle, receiving a data packet of a (k−1)-th node is completed between $\delta_{k-1,n-1} - \lambda_{max}$ and $\delta_{k-1,n-1} \lambda_{max} + W_{k-1,n} + D_{k-1,n}$ based on a time at which an n-th beacon packet is broadcasted. Accordingly, in the present invention, $\delta_{k,n-1} - \lambda_{max}$ is larger than $\delta_{k-1,n-1} \lambda_{max} + W_{k-1,n} + D_{k-1,n}$ so that receiving collision between a data packet of a (k−1)-th node and a data packet of a k-th node does not occur in an n-th cycle.

In step S1160, the sink node sets a parameter k to 1, and sets a time delay $W_{1,n}$ assigned to a first node in an n-th cycle to "0", and calculates a maximum time value $t_{1,n}^{max}$ at which receiving a data packet of the first node starts in the n-th cycle as Equation 118 below.

$$t_{1,n}^{max} = \delta_{1,n-1} + \lambda_{max} + w_{1,n} + D_{1,n} \quad \text{[Equation 118]}$$

In step S1170, the sink node determines whether or not the parameter k is smaller than K, and when the parameter k is smaller than K (Y), in step S1180, the sink node increases k by "1", and performs the next step S1190. Meanwhile, when k is equal to or greater than K (N), the sink node performs step S1220 below.

In step S1190, the sink node calculates a minimum time value $t_{k,n}^{min}$ at which receiving a data packet from nodes starts in the n-th cycle as Equation 119 below.

$$t_{k,n}^{min} = \delta_{k,n-1} - \lambda_{max} \quad \text{[Equation 119]}$$

In step S1200, the sink node calculates a time delay $W_{k,n}$ assigned to nodes in the n-th cycle as Equation 120 below.

$$w_{k,n} = \max\{0, t_{k-1,n}^{max} - t_{k,n}^{min}\} \quad \text{[Equation 120]}$$

In step S1210, the sink node calculates a maximum time value $t_{k,n}^{max}$ at which receiving a data packet of a node starts in the n-th cycle as Equation 121 below, and step S1170 is performed.

$$t_{k,n}^{max} = \delta_{k,n-1} + \lambda_{max} + w_{k,n} + D_{k,n} \quad \text{[Equation 121]}$$

In step S1220, the sink node determines whether or not to broadcast a beacon packet.

In step S1220, when the sink node determines not to broadcast a beacon packet (N), the scheduling method is ended.

Meanwhile, when the sink node determines to broadcast a beacon packet in step S1220 (Y), in step S1230, the sink node broadcasts a beacon packet to multiple nodes at a time $t_{0,n}$ at which a beacon packet of an n-th cycle is broadcasted.

Then, in step S1240, the sink node receives a data packet of the last-th (K-th) node, or the sink node waits for a maximum time value $t_{k,n}^{max}$ at which receiving the data packet of the last-th node starts in the n-th cycle. In step S1250, the sink node increases a cycle by 1, and then step S1150 is performed.

According to the first embodiment of the present invention configured as above, in the method of scheduling for the underwater wireless mobile network, the sink node broadcasts an initial packet to multiple nodes; the sink node receives an initial response packet from multiple nodes for a first set time $T_{init}$; the sink node calculates an RTT $RTT_H$ between the sink node and multiple nodes by using the received initial response packet; the sink node determines whether or not a collision occurs when receiving an initial response packet; if not, the sink node sorts the nodes in ascending order of round trip time by using the calculated round trip times $RTT_H$; the sink node sets a parameter k to 1 and a latency $w_{1,1}$ of a first node to "0"; the sink node calculates a maximum time value $t_{1,1}^{max}$ at which receiving a data packet of the first node starts, and determines whether or not the parameter k is smaller than the last-th (K-th) parameter; if so, the sink node sets the parameter k to k+1; the sink node calculates a minimum time value $t_{k,1}^{min}$ at which a data packet of the k-th node arrives the sink node; the sink node calculates a latency $w_{k,1}$ of the k-th node; the sink node calculates a maximum time value $t_{k,1}^{max}$ at which the sink node receives a data packet of the k-th node; when a parameter k is not smaller than the last-th (K-th) parameter, the sink node broadcasts a first beacon packet to multiple nodes for a third set time $t_{0,1}$ 1 the sink node receives a data packet of the last-th(K-th) node or waits for a fourth set time $t_{K,1}^{max}+D_{K,1}$ after broadcasting the first beacon packet; the sink node calculates a round trip time $\delta_{k,n}$ between the sink node and the k-th node; the sink node sorts the nodes in ascending order of round trip time by using calculated round trip times $\delta_{k,n}$; the sink node calculates a round trip time variation $\lambda_{max}$ of a node which may vary in one cycle, and sets the parameter k to 1; the sink node sets a time delay $W_{1,n}$ assigned to the first node in an n-th cycle to "0", calculates a maximum time value $t_{1,n}^{max}$ at which receiving of a data packet of the first node starts in an n-th cycle, determines whether or not the parameter k is smaller than the last-th (K-th) parameter, if so, sets the parameter (k) to k+1, and calculates a minimum time value $t_{k,n}^{min}$ at which receiving of a data packet of the k-th node starts in the n-th cycle; the sink node calculates a time delay $W_{k,n}$ assigned to the k-th node in the n-th cycle; the sink node calculates a maximum time value $t_{k,n}^{max}$ at which receiving of a data packet of the k-th node starts in the n-th cycle, and when, when the parameter k is not smaller than the last-th (K-th) parameter, the sink node determines whether or not to broadcast a beacon packet. When the sink node determines not to broadcast a beacon packet, the scheduling method is ended. Accordingly, the method is performed regardless of navigation information of a mobile node underwater, and network throughput may be improved since additional packet exchanging for temporal synchronization is not required. In addition, scheduling information is determined by information corresponding to a temporal difference rather than an absolute time, and thus the method is operated accurately even though local start information of each node is different. Further, an accurate value of round trip time information between the sink node and the node is calculated at the end of each cycle, and thus periodical re-initialization is not required since for the schedule information and an error is not accumulated as times passes.

Second Embodiment

FIG. 5 is a view showing a network topology to which a method of scheduling for an underwater wireless mobile network according to a second embodiment of the present invention is applied. A sink node broadcasts a beacon packet including transmission schedule to nodes, and nodes other than the sink node which have received the beacon packet of the sink node transmit a data packet according to transmission schedule of each node which is included in the beacon packet. Nodes other than the sink node are simply called a node. In the present invention, performing communication by using a sound wave underwater is considered, and it is assumed that a maximum relative velocity $v_{max}$ between the sink node and a k-th node, a minimum sound wave transmission velocity $c_{min}$ underwater, and a number K of nodes except for the sink node are provided.

FIG. 6 is a view showing a conceptual diagram of a cycle in a method of scheduling for an underwater wireless mobile network according to the second embodiment of the present invention.

In the present invention, an n-th cycle means, as shown in FIG. 6, a section from the time at which the sink node start broadcasting an n-th beacon packet to the time at which the sink node starts broadcasting an (n+1)-th beacon packet after completing receiving of a data packet from all nodes.

A time at which a beacon packet of an n-th cycle is broadcasted is represented as $t_{0,n}$. Then, $C_n=t_{0,n+1}-t_{0,n}$ [Herein, is a duration time of the n-th cycle.]. A time at which the sink node starts receiving a data packet of a k-th node in the n-th cycle is represented as $t_{k,n}$.

According to the second embodiment of the present invention, in a method of scheduling for a wireless mobile network underwater, the sink node transmits a beacon packet including information indicating to each node a time delay to be applied when transmitting a data packet after receiving the beacon packet.

A latency from receiving a beacon of a k-th node in an n-th cycle to transmitting a data packet is represented as $W_{k,n}$. In $W_{k,n}$ it is not required to represent an n-th cycle, but for clarity in describing the present invention, a subscript representing the n-th cycle is used in $W_{k,n}$. Due to the mobility of a node, a round trip time of nodes varies for each cycle. In the present invention, a round trip time which varies as above is estimated by using round trip time information of previous two cycles, and $W_{k,n}$ is determined so that collision does not occur in the sink node when receiving a data packet from nodes.

In the present invention, it is assumed that an initial round trip time $\delta_{k,0}$ between the sink node and each node and a time $t_{k,0}$ at which the initial round trip time $\delta_{k,0}$ between the sink node and each node is obtained are provided. Various methods of obtaining $\delta_{k,0}$ and $t_{k,0}$ are present, and whichever method is used, in the method of scheduling for the wireless mobile network underwater according to the second embodiment of the present invention, when an number of cycles increases, a normal state is achieved regardless of $\delta_{k,0}$ and $t_{k,0}$. Accordingly, change in performance of a time division multiple access method of the present invention in response to a method used for obtaining $\delta_{k,0}$ and $t_{k,0}$ is very small.

Hereinafter, a method of scheduling for an underwater wireless mobile network according to the second embodiment of the present invention which is performed in a network topology configured as above will be described.

FIGS. 7a to 7b are views showing flowcharts illustrating the method of scheduling for the underwater wireless mobile network according to the second embodiment of the present invention. Herein, S means a step.

First, in step S2010, in order to determine a $W_{k,1}$ that is a schedule of a first cycle by using $\delta_{k,0}$ and $t_{k,0}$, the sink node performs an initial stage first as [Equation 201] below.

$$n=1, u_{1,k}=1, u_{2,k}=0, l_k=0, \alpha_k=\delta_{k,0}, C_0=C_D \quad \text{[Equation 201]}$$

[Herein, k is a natural number equal to or smaller than K. In an n-th cycle, $u_{1,k}$ is a parameter representing the availability of obtaining a round trip time of a k-th node in an (n−1)-th cycle, and since a $\delta_{k,0}$ value is provided, all are set to 1. In the n-th cycle, $u_{2,k}$ is a parameter representing the availability of obtaining a round trip time of the k-th node in an (n−2)-th cycle. Since round trip time information obtained previous to $\delta_{k,0}$ is not present, it is set to 0. $\alpha_k$ is a round trip time of the k-th node which is the most recently obtained. Currently, since $\delta_{k,0}$ is the most recently obtained round trip time (in other words, an initial round trip time between the sink node and each node) so that it is set as $\alpha_k=\delta_{k,0}$. $l_k$ is a cycle in which $\alpha_k$ is obtained, and is set to 0. $C_n$ is a duration time of the n-th cycle, and since a cycle duration time previous to a first cycle is not known, a user has to determine a proper $C_0$ value. Herein, the value is represented as $C_D$. $C_D$ may be set as an average value that is empirically known or is estimated as Equation 202 below since the cycle duration time is greater than sum of the entire data packet length and sum of a minimum value of a round trip time of nodes.]

$$C_D = \min\{\delta_{1,0}, \ldots, \delta_{K,0}\} + \sum_{k=1}^{K} D_{k,1} \quad \text{[Equation 202]}$$

[$D_{k,1}$ is a value obtained by converting a length of a data packet of the k-th node in a first cycle to a time.]

Then, in steps S2020 to S2140, the sink node receives a beacon of the k-th node in the n-th cycle by using the following steps, and receives a data packet of each node in a cycle unit by calculating a latency taken to transmit a data packet.

[Step S2020]

The sink node determines a receiving order of a data packet, and sets a time delay $w_{1,n}$ assigned to a first node in the n-th cycle to 0.

In more detail, sorting nodes in ascending order of $\alpha_k$ is performed, then the sink node sets as k=1, and $w_{1,n}$=0. A k-th node means a node having the k-th lowest $\alpha_k$. In the n-th cycle, a data packet of the k-th node is received in the sink node at a k-th order. In other words, the sorted order in the above means the order in which a data packet arrives in the sink node. As a sorting method that may be additionally considered, a method of sorting nodes having a $u_{1,k}$ value of 1 in ascending order of $\alpha_k$, then sorting nodes having a $u_{2,k}$ value of 1 among $u_{1,k}$ values of 0 in ascending order of $\alpha_k$, and then sorting nodes having $u_{1,k}$ and $u_{2,k}$ values of 0 in ascending order of $\alpha_k$ may be used so that the priority is assigned to nodes having recently obtained a round trip time. In addition, according to the application field, various sorting methods based on the priority may be present.

[Step S2030]

The sink node estimates a round trip time $\hat{\delta}_{1,n}$ of the first node in the n-th cycle, and calculates a data packet receiving completion time $e_1$ of the first node.

In more detail, when $u_{1,1}+u_{2,1}=2$, that is, when a round trip time of the first node is successfully obtained in recent two cycles, a round trip time $\hat{\delta}_{1,n}$ of the first node in the n-th cycle is estimated, and a data packet receiving completion time $e_1$ of the first node is calculated as [Equation 203] below.

$$\hat{\delta}_{1,n} = \frac{1}{1-X_{1,n}}(\delta_{1,n-1} + X_{1,n}(t_{0,n} + D_{b,n} - t_{1,n-1})) \quad \text{[Equation 203]}$$

$$e_1 = t_{0,n} + D_{b,n} + \hat{\delta}_{1,n} + \tau_g$$

[$\tau_g$ is a guard time, $\delta_{1,n-1}$ is around trip time of the first node obtained in an (n−1)-th cycle, $D_{b,n}$ is a value obtained by covering a length of a beacon packet in the n-th cycle to a time, $t_{1,n-1}$ is a time at which the sink node starts receiving a data packet of the first node in the (n−1)-th cycle, and $X_{1,n}$ is as Equation 204 below.]

$$X_{1,n} = \frac{\delta_{1,n-1} - \delta_{1,n-2}}{t_{1,n-1} - t_{1,n-2}} \quad \text{[Equation 204]}$$

[$\delta_{1,n-2}$ is a round trip time of the first node obtained in an (n−2)-th cycle, and $t_{1,n-2}$ is a time at which the sink node starts receiving a data packet of the first node in the (n−2)-th cycle.]

When a $u_{1,1}+u_{2,1}$ value is smaller than 2, that is, when a round trip time of the first node is not successfully obtained for at least one time in recent two cycles, a round trip time $\hat{\delta}_{1,n}$ of the first node in the n-th cycle is estimated, and a data packet receiving completion time $e_1$ of the first node is calculated as [Equation 205] below.

$$\hat{\delta}_{1,n} = \min\{\delta_{max}, \alpha_1 + 2v_{max}C_{n-1}(n-l_1)/c_{min}\}$$

$$e_1 = t_{0,n} + D_{b,n} + \hat{\delta}_{1,n} \quad \text{[Equation 205]}$$

[$\delta_{max}$ is a maximum value of a round trip time, $\alpha_1$ is a round trip time of the first node which is the most recently obtained, $v_{max}$ is a maximum relative velocity between the sink node and a k-th node, $C_{n-1}$ is a duration time of the (n−1)-th cycle, $l_1$ is the most recent cycle in which a round trip time of the first node, and $c_{min}$ is a minimum sound wave transmission velocity underwater.]

[Equation 203] is obtained by solving simultaneous equations of [Equation 206] below.

$$\hat{\delta}_{1,n} = \delta_{1,n-1} + X_{1,n}(\hat{t}_{1,n} - t_{1,n-1})$$

$$\hat{t}_{1,n} = t_{0,n} + D_{b,n} + \hat{\delta}_{1,n} \quad \text{[Equation 206]}$$

[$\hat{t}_{1,n}$ is a value obtained by estimating a data packet receiving time $t_{1,n}$ of the first node in the n-th cycle.]

In [Equation 206], by the first equation, approximation of a round trip time and a data packet receiving time of a data packet of the first node are obtained by a straight line passing two points of $(t_{1,n-2}, \delta_{1,n-2})$ and $(t_{1,n-1}, \delta_{1,n-1})$, and a round trip time $\hat{\delta}_{1,n}$ calculated from $\hat{t}_{1,n}$. Meanwhile, $\hat{t}_{1,n}$ is not accurately obtained at a time when calculating scheduling information of the n-th cycle. As a round trip time and a data packet receiving time of the first node have a relation as the second equation of above [Equation 206], $\hat{\delta}_{1,n}$ may be calculated as [Equation 203] by solving [Equation 206]. [Equation 203] may not be solved when $X_{1,n}=1$. Herein, the above case corresponds to a case where a relative velocity of the first node and the sink node is equal to a velocity of a sound wave, so that, practically, the case does not occur.

When a round trip time of the first node is not obtained for at least one cycle among an (n−1)-th cycle and an (n−2)-th cycle, a round trip time of the first node is not obtained as [Equation 206]. Thus, by using a maximum variation that is available from the most recent time at which a round trip time of the first node is obtained as [Equation 205], a round trip time is estimated so that collision is avoided. In [Equation 205], $l_1$ is the most recent cycle in which a round trip time of the first node is obtained, and thus $n-l_1$ means an elapsed time after obtaining the round trip time. Herein, an average duration time of a cycle is approximated to a duration time of an (n−1)-th cycle which is the most recent cycle, and $2v_{max}C_{n-1}(n-l_1)/c_{min}$ becomes a maximum variation of the round trip time in the n-th cycle after obtaining the most recent round trip time. Accordingly, $\alpha_1+2v_{max}C_{n-1}(n-l_1)/c_{min}$ becomes a maximum round trip time of the first node in the n-th cycle. The above value does not exceed $\delta_{max}$, and thus the round trip time of the first node is calculated as [Equation 205]. When a round trip time of the first node is not obtained in at least one of an (n−1)-th cycle and an (n−2)-th cycle, it may be recognized that collision with a packet of other nodes has occurred as the mobility of the first node is suddenly changed when a physical layer is perfect. Accordingly, it is not preferable to estimate a round trip time of the n-th cycle from previous round trip time information. In addition, $\hat{\delta}_{1,n}$ calculated as above is a maximum value that $\delta_{1,n}$ may have, and thus a guard time is not included in [Equation 205] when calculating $e_1$ different to [Equation 203].

[Step S2040]

The sink node determines whether or not the parameter k is smaller than the last-th (K-th) parameter.

[Step S2050]

When the parameter k is smaller than the last-th (K-th) parameter (Y) in step S2040, the sink node sets the parameter k to k+1.

[Step S2060]

The sink node estimates a round trip time $\hat{\delta}_{1,n}$ of a k-th node in the n-th cycle.

In more detail, when $u_{1,k}+u_{2,k}=2$, that is, when a round trip time of the k-th node is successfully obtained in recent two cycles, a round trip time $\hat{\delta}_{k,n}$ of the k-th node in the n-th cycle is estimated as [Equation 207] below.

$$\hat{\delta}_{k,n}=\delta_{k,n-1}+X_{k,n}(e_{k-1}-t_{k,n-1}) \quad \text{[Equation 207]}$$

[$\delta_{k,n-1}$ is a round trip time of the k-th node obtained in an (n−1)-th cycle, $e_{k-1}$ is a value obtained by estimating a time at which the sink node completes receiving a data packet of a (k−1)-th node, $t_{k,n-1}$ is a time at which the sink node starts receiving a data packet of the k-th node in the (n−1)-th cycle, and $X_{k,n}$ is as Equation 211 below]

$$X_{k,n} = \frac{\delta_{k,n-1} - \delta_{k,n-2}}{t_{k,n-1} - t_{k,n-2}} \quad \text{[Equation 211]}$$

[$\delta_{k,n-2}$ is a round trip time of the k-th node obtained in an (n−2)-th cycle, $t_{k,n-2}$ is a time at which the sink node starts receiving a data packet of the k-th node in the (n−2)-th cycle.]

By using the [Equation 207], relation between a data packet receiving time and a round trip time of the k-th node is approximated by a straight line passing two points of $(t_{k,n-2}, \delta_{k,n-2})$ and $(t_{k,n-1}, \delta_{k,n-1})$, and a round trip time $\hat{\delta}_{k,n}$ is obtained by calculating a time $e_{k-1}$ at which receiving of a data packet of a (k−1)-th node which is the just previous data packet is completed. Accordingly, a time $p_k$ at which the sink node starts receiving a data packet of the k-th node while the k-th node receives a beacon packet and as soon as transmits a data packet with a round trip time $\hat{\delta}_{k,n}$ is calculated as [Equation 208] below.

$$p_k=t_{0,n}+D_{b,n}+\hat{\delta}_{k,n} \quad \text{[Equation 208]}$$

Herein, when $p_k>e_{k-1}$, even though the k-th node transmits a data packet as soon as a beacon packet is received, receiving a data packet of the k-th node starts when receiving a data packet of a (k−1)-th node is completed, and after elapsing $p_k-e_{k-1}$.

Accordingly, a round trip time of the k-th node at the time $e_{k-1}$ estimated by the [Equation 207] is not suitable for an estimated value of a round trip time at a time at which a data packet of the k-th node actually arrives. Accordingly, a round trip time of the k-th node is estimated by using a method of estimating a round trip time of the first node as [Equation 203] by solving [Equation 206]. Accordingly, when $p_k>e_{k-1}$, a round trip time of the k-th node is estimated as [Equation 210] by solving [Equation 209] as below. In the [Equation 210], $X_{k,n}$ is as [Equation 211] below.

$$\hat{\delta}_{k,n}=\delta_{k,n-1}+X_{k,n}(\hat{t}_{k,n}-t_{k,n-1})$$

$$\hat{t}_{k,n}=t_{0,n}+D_{b,n}+\hat{\delta}_{k,n}, \text{ and} \quad \text{[Equation 209]}$$

$$\hat{\delta}_{k,n} = \frac{1}{1-X_{k,n}}(\delta_{k,n-1} + X_{k,n}(t_{0,n} + D_{b,n} - t_{k,n-1})) \quad \text{[Equation 210]}$$

When a $u_{1,k}+u_{2,k}$ value is smaller than 2, that is, when a round trip time of the k-th node is not successfully obtained for at least one time in recent two cycles, a round trip time $\hat{\delta}_{k,n}$ of the k-th node in the n-th cycle is estimated as [Equation 212] below.

$$\hat{\delta}_{k,n}=\max\{0,\alpha_k-2v_{max}C_{n-1}(n-l_k)/c_{min}\} \quad \text{[Equation 212]}$$

[$l_k$ is a cycle in which $\alpha_k$ is obtained]

The [Equation 212] differs from [Equation 205], in order to avoid collision with a subsequent data packet, a completion time of a previous data packet is estimated in a direction to be late, and a receiving time of a subsequent data packet is estimated in a direction to be early.

[Step S2070]

When the k-th node transmits a data packet as soon as a beacon packet is received with a round trip time $\hat{\delta}_{k,n}$ of the k-th node estimated by the sink node in step S2060, an estimated time value $p_k$ at which the sink node starts receiving a data packet of the k-th node is calculated as [Equation 213] below.

$$p_k=t_{0,n}+D_{b,n}+\hat{\delta}_{k,n} \quad \text{[Equation 213]}$$

[Step S2080]

By using the estimated time value $p_k$ at which the sink node starts receiving a data packet of the k-th node and which is obtained in step S2070, the sink node calculates a latency $W_{k,n}$ of the k-th node as [Equation 214] below.

$$w_{k,n}=\max\{0,e_{k-1}-p_k\} \quad \text{[Equation 214]}$$

[Step S2090]

After calculating the estimated time value $e_k$ at which the sink node completes receiving a data packet of the k-th node by using the estimated time value $p_k$ at which the sink node starts receiving a data packet of the k-th node which is obtained in step S2070 and a latency $W_{k,n}$ of the k-th node which is obtained in step S2080, step S2040 is performed.

In more detail, when $u_{1,k}+u_{2,k}=2$, that is, when a round trip time of the k-th node is successfully obtained in recent two cycles, the estimated time value $e_k$ at which the sink node completes receiving a data packet of the k-th node is calculated as [Equation 215] below.

$$e_k = p_k + D_{k,n} + w_{k,n} + \tau_g \quad \text{[Equation 215]}$$

[$D_{k,n}$ is a value obtained by converting a length of a data packet of the k-th node in the n-th cycle to a time.]

When a $u_{1,k}+u_{2,k}$ value is smaller than 2, that is, when a round trip time of the k-th node is not successfully obtained for at least one time in recent two cycles, the estimated time value $e_k$ at which the sink node completes receiving a data packet of the k-th node is calculated as [Equation 216] below.

$$e_k = t_{0,n} + D_{b,n} + w_{k,n} + \min\{\delta_{max}, \alpha_k + 2v_{max}C_{n-1}$$
$$(n-l_k)/c_{min}\} + D_{k,n} \quad \text{[Equation 216]}$$

When calculating of the estimated time value $e_k$ at which the sink node completes receiving a data packet of the k-th node, step S2040 is performed.

[Step S2100]

When it is determined that the parameter k is not smaller than the last-th (K-th) parameter (N) in step S2040, the sink node determines whether or not to continue a cycle by determining whether or not to broadcast a beacon packet.

In the present step S2100, when a cycle does not continue as a beacon packet is not broadcasted (N), the scheduling method is ended.

[Step S2110]

When a cycle continues as a beacon packet is broadcasted in step S2100 (Y), the sink node broadcasts a beacon packet at a time $t_{0,n}$ at which the sink node starts broadcasting a beacon packet in the n-th cycle.

[Step S2120]

Receiving of a data packet of the K-th node is completed or exceeding the estimated time value $e_k$ at which receiving of a data packet of a K-th node is completed.

[Step S2130]

After performing step S2120, the sink node calculate a round trip time $\delta_{k,n}$ of the k-th node in the n-th cycle, and updates availability values $u_{1,k}$ and $u_{2,k}$ of the obtained round trip time, and round trip time related information $\alpha_k$ and $l_k$ which is the most recently obtained.

In more detail, in order to update the availability values $u_{1,k}$ and $u_{2,k}$) of obtaining the round trip time, as [Equation 217] below, an availability value $u_{2,k}$ of obtaining the round trip time is updated for all nodes. When, a data packet of the k-th node in the n-th cycle is successfully received, an update is performed as [Equation 218] below.

$$u_{2,k} = u_{1,k}, \quad \text{[Equation 217]}$$

$$u_{1,k} = 1 \quad \text{[Equation 218]}$$

When a data packet of the k-th node in the n-th cycle is not successfully received, [Equation 219] below is performed.

$$u_{1,k} = 0 \quad \text{[Equation 219]}$$

The most recently obtained round trip time related information $l_k$ is updated as [Equation 220] below.

$$l_k = \max\{l_k, nu_{1,k}\} \quad \text{[Equation 220]}$$

In addition, when the availability value $u_{1,k}$ of obtaining the round trip time is 1, a round trip time $\delta_{k,n}$ of the k-th node in the n-th cycle is calculated, and the recently obtained round trip time related information $\alpha_k$ is updated as [Equation 221] below.

$$\delta_{k,n} = t_{k,n} - (t_{0,n} + D_{b,n} + W_{k,n}),$$

$$\alpha_k = \delta_{k,n} \quad \text{[Equation 221]}$$

[Step S2140]

The sink node increases n by 1, and step S2020 is performed to calculate $W_{k,n+1}$ for an (n+1)-th cycle.

According to the second embodiment of the present invention configured as above, in the method of scheduling for the underwater wireless mobile network, the sink node performs an initial stage; the sink node determines a receiving order of a data packet and sets a time delay $w_{1,n}$ assigned to a first node in the n-th cycle; the sink node estimates a round trip time $\hat{\delta}_{1,n}$ of the first node in the n-th cycle, and calculates a data packet receiving completion time $e_1$ of the first node; the sink node determines whether or not a parameter k is smaller than the last-th (K-th) parameter; if so, the sink node sets the parameter k to k+1; the sink node estimates a round trip time $\hat{\delta}_{k,n}$ of a k-th node in the n-th cycle; the sink node calculates an estimated time value $p_k$ at which the sink node starts receiving a data packet of the k-th node by using the estimated round trip time $\hat{\delta}_{k,n}$ of the k-th node when the k-th node transmits a data packet as soon as a beacon packet is received; the sink node calculates a latency $W_{k,n}$ of the k-th node by using the calculated estimated time value $p_k$ at which the sink node starts receiving the data packet of the k-th node; and the sink node calculates an estimated time value $e_k$ at which receiving of a data packet of the k-th node is completed by using the calculated estimated time value $p_k$ at which the sink node starts receiving the data packet of the k-th node; and calculates a latency $W_{k,n}$ of the k-th node, and performs a determination step.

In other words, under a network environment where a round trip time is long and a transmission velocity of a physical layer is slow as underwater sound wireless mobile network, etc., when multiple modes transmit a data packet to a sink node by using a time division multiple access method, a round trip time according to the mobility of a node is tracked in a cycle unit, and thus an idle time is minimized when the sink node receives a data packet from the nodes. Accordingly, network efficiency according to channel usage efficiency may be remarkably improved. Particularly, when a number of nodes increases, network efficiency increases more. The method of scheduling for the underwater wireless mobile network according to the present invention uses information corresponding to a time difference rather than an absolute time basis so that the method is accurately operated even though local time information of each node is different. Accordingly, time synchronization is not required, and thus the method is applicable to the application field in which many resources are consumed for time synchronization.

In addition, an accurate value for round trip time information is obtained for each cycle, and thus an error is not accumulated and periodical re-initialization is not required.

Third Embodiment

FIG. 8 is a view showing a network topology to which a method of scheduling for an underwater wireless mobile network according to a third embodiment of the present invention is applied. A sink node broadcasts a beacon packet including a transmission schedule of nodes, and nodes other than the sink node and having received the beacon packet of the sink node transmit to the sink node a data packet according to the transmission schedule of each node which is included in the beacon packet. Nodes except for the sink node are simply called a node. In the present invention, it is considered that communication is performed by using a sound wave underwater, and it is assumed that a maximum relative velocity $v_{max}$ between the sink node and a k-th node, a minimum value $c_{min}$ of a sound wave transfer velocity underwater, and a total number K of nodes except for the sink node are provided.

FIG. 9 is a view showing a conceptual diagram of a cycle in a method of scheduling for an underwater wireless mobile network according to the third embodiment of the present invention.

In the present invention, an n-th cycle means, as shown in FIG. 9, a time from at which a sink node broadcasts an n-th beacon packet to at which the sink node starts broadcasting an (n+1)-th beacon packet after completing receiving a data packet from all nodes.

A time at which a beacon packet of an n-th cycle is broadcasted is represented as $t_{0,n}$. Then, $C_n=t_{0,n+1}-t_{0,n}$ [Herein, $C_n$ is a duration time of the n-th cycle.]. In the n-th cycle, a time at which the sink node starts receiving a data packet of a k-th node is represented as $t_{k,n}$.

According to the third embodiment of the present invention, in the method of scheduling for the underwater wireless mobile network, the sink node transmits a beacon packet including information indicating that after how much time delay each node has to transmit a data packet after receiving the beacon packet.

A latency taken to transmit a data packet after receiving a beacon of the k-th node in the n-th cycle is represented as $W_{k,n}$. In $W_{k,n}$, it is not required to represent the n-th cycle, but for clarity in describing the present invention, a subscript representing the n-th cycle is used in $W_{k,n}$. Due to the mobility of a node, a round trip time of nodes varies in each cycle. In the present invention, a round trip time varying as above is estimated by using round trip time information of M previous cycles, and $W_{k,n}$ is determined so that collision does not occur in the sink node when receiving a data packet of the nodes.

In the present invention, it is assumed that an initial round trip time $\delta_{k,0}$ between the sink node and each node, and a time $t_{k,0}$ at which the initial round trip time $\delta_{k,0}$ between the sink node and each node is obtained are provided. Various methods of obtaining $\delta_{k,0}$ and $t_{k,0}$ are present, and whichever method is used, in the method of scheduling for the wireless mobile network underwater according to the third embodiment of the present invention which uses a polynomial equation interpolation method, when a number of cycles increases, a normal state is achieved regardless $\delta_{k,0}$ and $t_{k,0}$. Accordingly, changes in performance of the scheduling method of the present invention in response to a method used for obtaining $\delta_{k,0}$ and $t_{k,0}$ is very small.

Hereinafter, a method of scheduling for an underwater wireless mobile network according to the third embodiment of the present invention which is performed in a network topology configured as above will be described.

FIG. 10a to FIG. 10c are views showing flowcharts for describing a method of scheduling for an underwater wireless mobile network according to the third embodiment of the present invention. Herein, S means a step.

First, in step S3010, in order to determine $W_{k,1}$ that is a schedule of a first cycle by using $\delta_{k,0}$ and $t_{k,0}$, a sink node performs an initial stage as [Equation 301] below.

$$n=1, u_{1,k}=1, l_k=0, \alpha_k=\delta_{k,0}, C_0=C_D, u_{m,k}=0. \quad \text{[Equation 301]}$$

[k is a natural number equal to or smaller than K, and m=2, 3, . . . , M. $u_{1,k}$ is a parameter representing the availability of obtaining a round trip time of a k-th node in an (n−1)-th cycle in an n-th cycle, and since a $\delta_{k,0}$ value is provided, all are set to 1. $u_{m,k}$ is a parameter representing the availability of obtaining the round trip time of the k-th node in an (n−m)-th cycle in the n-th cycle, since round trip time information obtained previous to $\delta_{k,0}$ is not present, when m is greater than 1, $u_{m,k}$ is set to 0. $\alpha_k$ is a round trip time of the k-th node which is the most recently obtained, and is set to $\alpha_k=\delta_{k,0}$ as the $\delta_{k,0}$ is the most recently obtained round trip time, currently. $l_k$ is a cycle in which $\alpha_k$ is obtained, and is set to 0. $C_n$ is a duration time of the n-th cycle, and since a duration time before a first cycle is unknown, a user has to determined a proper $C_0$ value, in Equation 301, the value is represented as $C_D$. $C_D$ may be set as the average value that is empirically known or is estimated as Equation 302 below since the cycle duration time is greater than sum of the entire data packet length and sum of a minimum value of a round trip time of nodes.]

$$C_D = \min\{\delta_{1,0}, \ldots, \delta_{K,0}\} + \sum_{k=1}^{K} D_{k,1} \quad \text{[Equation 302]}$$

[$D_{k,1}$ is a value obtained by converting a length of a data packet of the k-th node in the first cycle to a time]

Then, in steps S3020~S3140, the sink node receives a beacon of the k-th node in the n-th cycle by using the following steps, and receives a data packet of each node in a cycle unit by calculating a latency taken to transmit a data packet.

[Step S3020]

The sink node determines a receiving order of a data packet, and sets a time delay $w_{1,n}$ assigned to a first node in the n-th cycle to 0.

In more detail, sorting $\alpha_k$ in ascending order is performed, then it is set to k=1, and to $w_{1,n}=0$. A k-th node means a node having the k-th lowest $\alpha_k$. In the n-th cycle, a data packet of the k-th node is received in the sink node at a k-th order. In other words, the sorted order in the above means the order in which a data packet arrives in the sink node. As a sorting method that may be additionally considered, a method of sorting nodes having a $u_{1,k}$ value of 1 in ascending order of $\alpha_k$, then sorting nodes having a $u_{2,k}$ value of 1 among $u_{1,k}$ values of 0 in ascending order of $\alpha_k$, then sorting nodes having $u_{1,k}$ and $u_{2,k}$ values of 0 in ascending order of $\alpha_k$, hereinafter by repeating, and the sorting modes having a $u_{1,k}$, $u_{2,k}$, . . . , $u_{m,k}$ value of 0 in ascending order of $\alpha_k$ may be used so that the priority is assigned to nodes having a recently obtained round trip time. In addition, according to the application field, various sorting methods based on the priority may be present.

[Step S3030]

The sink node estimates a round trip time $\hat{\delta}_{1,n}$ of the first node in the n-th cycle, and calculates a data packet receiving completion time $e_1$ of the first node.

In more detail, it is defined as $$J_1 = \sum_{m=1}^{M} u_{m,1}.$$

$J_0$ is a natural number equal to or greater than 2. $J_0$ is a value determined by a user. When $J_1 \geq J_0$, that is, when a number of times that a round trip time of the first node is successfully obtained during recent M cycles is equal to or greater than $J_0$, a round trip time $\hat{\delta}_{1,n}$ of the first node in the n-th cycle is estimated by solving simultaneous equations of [Equation 206] below.

$$\hat{\delta}_{1,n}=Q_1(\hat{t}_{1,n})$$

$$\hat{t}_{1,n}=t_{0,n}+D_{b,n}+\hat{\delta}_{1,n} \quad \text{[Equation 303]}$$

[$Q_1(x)$ is a polynomial equation of minimum order which passes coordinates of $$(t_{1,n-m_1}, \delta_{1,n-m_1}), \ldots, (t_{1,n-m_j}, \delta_{1,n-m_j}), \ldots, (t_{1,n-m_{J_1}}, \delta_{1,n-m_{J_1}}).$$

Herein, a valid round trip time of the first node in a ($n-m_j$) cycle is obtained, and a round trip time value of the first node at that time is $\delta_{1,n-m_j}$. $Q_1(x)$ is a polynomial equation of order ($J_1-1$), and is easily determined by using a polynomial equation interpolation method. For example, a divided difference method may be used. [Equation 303] is simultaneous equations of a polynomial equation of order ($J_1-1$) and a polynomial equation of order 1, by substituting the first polynomial equation of order ($J_1-1$) of [Equation 303] for the second polynomial equation of order 1 of [Equation 303], and as a result, resulting in a problem of solving a polynomial equation of order ($J_1-1$). For [Equation 303], a solution may be single, may not be present, may be present in plural, or may be present infinitely. When a solution of [Equation 303] is not present, it corresponds to a case where the first polynomial equation of order ($J_1-1$) of [Equation 303] is above or below the second polynomial equation of order 1 of [Equation 303]. In the present invention, since $0 \leq \hat{\delta}_{1,n} \leq \delta_{max}$, that is, a range of a $\hat{\delta}_{1,n}$ value is limited, the first polynomial equation of order ($J_1-1$) of [Equation 303] is represented in a graphs in a form close to be parallel to an $t_{1,n}$ axis within a predetermined range according to changes in $t_{1,n}$. Meanwhile, the second polynomial equation of order 1 of [Equation 303] has a slope of "1". Accordingly, there is no case where a solution is not present. In addition, when $J_1$ is 2, the first polynomial equation of order of ($J_1-1$) of [Equation 303] becomes a polynomial equation of order 1. For the above reasons, the two polynomial equations of order 1 constituting [Equation 303] differ in a slope from each other, and thus a solution in a real number is present in [Equation 303]. When $J_1$ is equal to or greater than 3, multiple solutions including a complex number solution may be present, and various real number solutions may be present. In order to obtain various real number solutions, a slope of the first polynomial equation of order ($J_1-1$) of [Equation 303] has to be remarkably changed more than "1". Herein, considering $0 \leq \hat{\delta}_{1,n} \leq \delta_{max}$, it means that history of a $\delta_{1,n}$ value has a value of "0" or "$\delta_{max}$" which is a value of the end. Herein, the chance of having a real number solution is also high. In other words, an environment where a remarkable change in topology is present as above corresponds to a case where estimating current round trip time information by using previous round trip time information is difficult. Herein, the present invention is designed to conservatively apply round trip time information, and thus may operate stably. Previously, it is mentioned that solving [Equation 303] is obtaining a solution of a polynomial equation of order ($J_1-1$). In general, the polynomial equation of order ($J_1-1$) has a number ($J_1-1$) of solutions. Herein, a complex number solution and a real number solution are combined. In the present invention, [Equation 303] is solved in an iterative manner as below rather than being directly analytically solved. First, an initial value of $\hat{t}_{1,n}$ is determined. For example, $\hat{t}_{1,n}=t_{0,n}+D_{b,n}+\alpha_1$. In addition, various methods of determining an initial value such as $\hat{t}_{1,n}=t_{0,n}+D_{b,n}+\delta_{max}$ may be present. Preferably, it is set to be a value close $t_{1,n}$. Now, by using the initial value of $t_{1,n}$, $\hat{\delta}_{1,n}$ is calculated from [Equation 303] as $\hat{\delta}_{1,n}=Q_1(\hat{t}_{1,n})$. Then, by using $\hat{\delta}_{1,n}$ calculated as above, $\hat{t}_{1,n}$ is calculated as $\hat{t}_{1,n}=t_{0,n}+D_{b,n}+\hat{\delta}_{1,n}$. Herein, $\hat{\delta}_{1,n}$ is calculated from the calculated $\hat{t}_{1,n}$ as $\hat{\delta}_{1,n}=Q_1(\hat{t}_{1,n})$. $\hat{t}_{1,n}$ is calculated by using $\hat{\delta}_{1,n}$ as $\hat{t}_{1,n}=t_{0,n}+D_{b,n}+\hat{\delta}_{1,n}$, and a process of calculating $\hat{\delta}_{1,n}$ from calculated $\hat{t}_{1,n}$ as $\hat{\delta}_{1,n}=Q_1(\hat{t}_{1,n})$ is repeated for a predetermined number. Then, the value that is finally calculated is determined as $\hat{\delta}_{1,n}$ and $\hat{t}_{1,n}$. Herein, a number of repetition times is not determined, and when a difference between previous calculated $\hat{\delta}_{1,n}$ and current calculated $\hat{\delta}_{1,n}$ is equal to or smaller than a predetermined value, the repeating process is stopped. Similarly, the repeating process is stopped when a difference between previous calculated $\hat{t}_{1,n}$ and current calculated $\hat{t}_{1,n}$ is equal to or smaller than a predetermined value. $\hat{\delta}_{1,n}$ is smaller than $\delta_{max}$, and thus is limited to have a value of Equation 304 below]

$$\hat{\delta}_{1,n}=\min\{\delta_{max},\hat{\delta}_{1,n}\} \quad \text{[Equation 304]}$$

[max is a maximum value of a round trip time.]

Then, a data packet receiving completion time $e_1$ of the first node is calculated as [Equation 305] below.

$$e_1=t_{0,n}+D_{b,n}+\hat{\delta}_{1,n}+D_{1,n}+\tau_g \quad \text{[Equation 305]}$$

[$D_{1,n}$ is a value obtained by converting a length of a data packet of the first node in the n-th cycle to a time; and $\tau_g$ is a guard time.]

When $J_1<J_0$, that is, when a number of times that a round trip time of the first node is successfully obtained is smaller than $J_0$ times during recent M cycles, it is determined that estimating a current time delay from a previous obtained time delay is not reasonable. Herein, a round trip time $\hat{\delta}_{1,n}$ of the first node in the n-th cycle is estimated, and a data packet receiving completion time $e_1$ of the first node is calculated as [Equation 306] below.

$$\hat{\delta}_{1,n}=\min\{\max,\alpha_1+2v_{max}C_{n-1}(n-l_1)/c_{min}\}$$

$$e_1=t_{0,n}+D_{b,n}+\hat{\delta}_{1,n} \quad \text{[Equation 306]}$$

[$\alpha_1$ is a round trip time of the first node which is the most recently obtained, $v_{max}$ is a maximum relative velocity between the sink node and the k-th node, $C_{n-1}$ is a duration time of the (n−1)-th cycle, $l_1$ is the most recent cycle in which a round trip time of the first node is obtained, and $c_{min}$ is a minimum transfer velocity of an underwater sound wave.]

When a round trip time is estimated by using a maximum variation that is available from the most recent time at which a round trip time of the first node is obtained as [Equation 306], collision is fundamentally prevented. In [Equation 306], $l_1$ is the most recent cycle in which a round trip time of the first node is obtained, so that ($n-l_1$) means an elapsed time after obtaining the round trip time. Herein, when an average duration time of a cycle is approximated to a duration time of an (n−1)-th cycle which is the most recent cycle, $2v_{max}C_{n-1}(n-l_1)/c_{min}$ becomes a maximum variation that is available for the round trip time in the n-th cycle after obtaining the most recent round trip time. Accordingly, $\alpha_1+2v_{max}C_{n-1}(n-l_1)/c_{min}$ becomes a maximum round trip time of the first node in the n-th cycle, and since the above value does not exceed $\delta_{max}$, a round trip time of the first node is calculated as [Equation 306]. When a round trip time of the first node is obtained during $J_0$ cycles which is smaller than the most recent M cycles, it may be recognized that collision with a packet of other nodes has occurred as the mobility of the first node is suddenly changed when a physical layer is perfect. Accordingly, estimating a round trip time of the n-th cycle from previous round trip time information is not preferable. In addition, $\hat{\delta}_{1,n}$ calculated as above is the largest value that $\delta_{1,n}$ may have, and in [Equation 306] of calculating $e_1$, different to [Equation 305], a guard time is not included.

[Step S3040]

The sink node determines whether or not the parameter k is smaller than the last-th (K-th) parameter.

[Step S3050]

When it is determined that the parameter k is smaller than the last-th (K-th) parameter (Y) in step S3040, the sink node sets the parameter k to k+1.

[Step S3060]

The sink node estimates a round trip time $\hat{\delta}_{k,n}$ of the k-th node in the n-th cycle.

In more detail, it is defined as $$J_k = \sum_{m=1}^{M} u_{m,k}.$$

When $J_k \geq J_0$, that is, when a number of times that a round trip time of the k-th node is successfully obtained is equal to or greater than $J_0$ times during M recent cycles, a round trip time $\hat{\delta}_{k,n}$ of the k-th node in the n-th cycle is estimated as [Equation 307] below.

$$\hat{\delta}_{k,n} = Q_k(e_{k-1}) \qquad \text{[Equation 307]}$$

[$Q_k(x)$ is a polynomial equation of minimum order passing coordinates of $$(t_{k,n-m_1}, \delta_{k,n-m_1}), \ldots, (t_{k,n-m_j}, \delta_{k,n-m_j}), \ldots, (t_{k,n-m_{J_k}}, \delta_{k,n-m_{J_k}}).$$

Herein, a valid round trip time of the k-th node is obtained in a $(n-m_j)$ cycle, and a round trip time value of the k-th node at that time is $\delta_{k,n-m_j}$. $Q_k(x)$ is a polynomial equation of order $(J_k-1)$, and may be easily determined by using a polynomial equation interpolation method. By Equation 307, previously obtained round trip time information is approximated by using numerical analysis interpolation method, and a round trip time $\hat{\delta}_{k,n}$ when a k-th data packet is received at a $e_{k-1}$ time at which receiving of a data packet of a (k−1)-th node which is the just precious data packet is completed.]

Accordingly, a time $p_k$ at which the sink node starts receiving a data packet of the k-th node when the k-th node transmits the data packet as soon as a beacon packet is received with a round trip time $\hat{\delta}_{k,n}$ is calculated as [Equation 308] below.

$$p_k = t_{0,n} + D_{b,n} + \hat{\delta}_{k,n} \qquad \text{[Equation 308]}$$

Herein, when $p_k > e_{k-1}$, receiving of a data packet of the k-th node starts after elapsing $p_k - e_{k-1}$ after receiving of a data packet of the (k−1)-th node is completed even though the k-th node transmits a data packet as soon as a beacon packet is received. Accordingly, a round trip time of the k-th node at a $e_{k-1}$ time estimated in [Equation 307] is not suitable to be used as an estimated value of a round trip time at a time at which a data packet of the k-th node is practically received. Accordingly, by solving [Equation 303] by using a repetition method, a round trip time of the k-th node is estimated as a method of estimating a round trip time of the first node. Accordingly, when $p_k > e_{k-1}$, a round trip time $\hat{\delta}_{k,n}$ of the k-th node is estimated by solving simultaneous equations of [Equation 309] as below.

$$\hat{\delta}_{k,n} = Q_k(\hat{t}_{k,n})$$

$$t_{k,n} = t_{0,n} + D_{b,n} + \hat{\delta}_{k,n} \qquad \text{[Equation 309]}$$

Similar to [Equation 303], [Equation 309] is a problem of obtaining a solution of a polynomial equation of order $(J_k-1)$. When $J_k$ is 2, since a solution of a real number is only present, an analytic solution is used. When $J_k$ is equal to or greater than 3, a solution is obtained by using the repetition method as below. First, an initial value of $\hat{t}_{k,n}$ is determined. For example, $\hat{t}_{k,n} = t_{0,n} + D_{b,n} + \alpha_{k,n}$. In addition, various methods of determining an initial value may be present such as $\hat{t}_{k,n} = t_{0,n} + D_{b,n} + \delta_{max}$. Preferably, it may be set to a value close to $t_{k,n}$. Now, $\hat{\delta}_{k,n}$ is calculated by using the initial value F n from [Equation 309] as $Q(\hat{t}_{k,n})$. Then, $\hat{\delta}_{k,n}$ is calculated by using $\hat{\delta}_{k,n}$ calculated as above as $\hat{t}_{k,n} = t_{0,n} + D_{b,n} + \hat{\delta}_{k,n}$. Herein, $\hat{\delta}_{k,n}$ is calculated from the calculated $\hat{t}_{k,n}$ as $\hat{\delta}_{k,n} = Q_k(\hat{t}_{k,n})$. $\hat{t}_{k,n}$ is calculated by using $\hat{\delta}_{k,n}$ as $\hat{t}_{k,n} = t_{0,n} + D_{b,n} + \hat{\delta}_{k,n}$, and a process of calculating $\hat{\delta}_{k,n}$ from calculated $\hat{t}_{k,n}$ as $\hat{\delta}_{k,n} = Q_k(\hat{t}_{k,n})$ is repeated for a predetermined time. Then, the finally calculated values are determined as $\hat{\delta}_{k,n}$ and $\hat{t}_{k,n}$. Herein, the number of repetition times is not determined, and when a difference between previous calculated $\hat{\delta}_{k,n}$ and current calculated $\hat{\delta}_{k,n}$ is equal to or smaller than a predetermined value, the repetition process is stopped. Similarly, when a difference between previous calculated $\hat{t}_{k,n}$ and current calculated $\hat{t}_{k,n}$, $\hat{\delta}_{k,n}$ is equal to or smaller than a predetermined value, the repetition process is stopped.

$\hat{\delta}_{k,n}$ is smaller than $\delta_{max}$, and thus is limited to have a value of [Equation 310] below.

$$\hat{\delta}_{k,n} = \min\{\delta_{max}, \hat{\delta}_{k,n}\} \qquad \text{[Equation 310]}$$

When $J_k < J_0$, that is, when a number of times that a round trip time of the k-th node is successfully obtained is smaller than $J_0$ times during recent M cycles, it is determined that estimating a current time delay from the previously obtained time delay is not reasonable. Herein, a round trip time $\hat{\delta}_{k,n}$ of the k-th node in the n-th cycle is estimated as [Equation 311] below.

$$\hat{\delta}_{k,n} = \max\{0, \alpha_k - 2v_{max}C_{n-1}(n-l_k)/c_{min}\} \qquad \text{[Equation 311]}$$

[Equation 311] differs from [Equation 306], in order to avoid collision with a subsequent data packet, a completion time of a previous data packet is estimated in a direction to be late, and a receiving time of a subsequent data packet is estimated in a direction to be early.

[Step S3070]

The sink node calculates an estimated time value $p_k$ at which the sink node starts receiving a data packet of the k-th node when the k-th node transmits a data packet as soon as a beacon packet is received with a round trip time $\hat{\delta}_{k,n}$ of the k-th node obtained in step S3060 as [Equation 308].

[Step S3080]

The sink node calculates a latency $W_{k,n}$ of the k-th node as [Equation 312] below by using the estimated time value $p_k$ at which the sink node starts receiving a data packet of the k-th node obtained in step S3070.

$$w_{k,n} = \max\{0, e_{k-1} - p_k\} \qquad \text{[Equation 312]}$$

Accordingly, in the n-th cycle, when the k-th node transmits a data packet after waiting a $w_{k,n}$ time after receiving a beacon packet, the data packet of the k-th node is received after receiving of a data packet of a (k−1)-th node is completed so that collision does not occur in the sink node when receiving a data packet.

[Step S3090]

The sink node calculates an estimated time value $e_k$ at which receiving of a data packet of the k-th node is completed by using the estimated time value $p_k$ at which the sink node starts receiving a data packet of the k-th node which is obtained in step S3070 and a latency $W_{k,n}$ of the k-th node obtained in step S3080, and step S3040 is performed.

In more detail, when $J_k \geq J_0$ (that is, when a number of times that a round trip time of the k-th node is successfully obtained is equal to or greater than $J_0$ times during M recent cycles), the estimated time value $e_k$ at which receiving of the data packet of the k-th node is completed is calculated as [Equation 313] below.

$$e_k = p_k + D_{k,n} + w_{k,n} + \tau_g \quad \text{[Equation 313]}$$

[$D_{k,n}$ is a value obtained by converting a length of a data packet of the k-th node in the n-th cycle to a time.]

Meanwhile, when $J_k < J_0$ (that is, when a number of times that a round trip time of the first node is successfully obtained is smaller than $J_0$ times during M recent cycles), the estimated time value $e_k$ at which the sink node completes receiving a data packet of the k-th node is calculated as [Equation 314] below.

$$e_k = t_{0,n} + D_{b,n} + w_{k,n} + \min\{\delta_{max}, \alpha_k + 2v_{max}C_{n-1}(n-l_k)/c_{min}\} + D_{k,n} \quad \text{[Equation 314]}$$

When $e_k$ is calculated, returning to step S3040 is performed.

[Step S3100]

When it is determined that the parameter k is not smaller than the last-th (K-th) parameter (N) in step S3040, the sink node determines whether or not to broadcast a beacon packet.

In other words, when calculating of a schedule of the K-th node is completed, the sink node determines whether or not to continue a cycle by determining whether or not broadcast a beacon packet.

Meanwhile, when a beacon packet is not broadcasted (N) in step S3040, that is, when a cycle does not continue, the scheduling method is ended.

[Step S3110]

When a beacon packet is broadcasted and a cycle continues(Y) in step S3100, the sink node broadcasts a beacon packet at a time $\delta_{k,n}$ at which the sink node starts broadcasting a beacon packet in the n-th cycle.

[Step S3120]

Receiving of a data packet of the K-th node is completed or the estimated value $e_k$ at which receiving of a data packet of the K-th node is completed has exceeded.

[Step S3130]

After performing step S3120, the sink node calculates a round trip time $\delta_{k,n}$ of the k-th node in the n-th cycle, and updates an availability value $u_{m,k}$ of obtaining a round trip time, and round trip time related information $\alpha_k$ that is the most recently obtained.

In more detail, at a time $t_{0,n}$, after broadcasting a beacon packet, when receiving of a data packet of the K-th node is completed or when a $e_k$ time has elapsed, the sink node may determine whether or not receiving of a data packet of each node in the n-th cycle is successfully performed. First, in order to update a $u_{m,k}$ value, as [Equation 315] below, for all k=1, 2, ... K and m=1, 2, ..., M−1, a $u_{m,k}$ value is updated for nodes as [Equation 315] below.

$$u_{m+1,k} = u_{m,k} \quad \text{[Equation 315]}$$

When a data packet of the k-th node in the n-th cycle is successfully received, [Equation 316] below is performed.

$$u_{1,k} = 1 \quad \text{[Equation 316]}$$

When a data packet of the k-th node in the n-th cycle is not successfully received, [Equation 317] below is performed.

$$u_{1,k} = 0 \quad \text{[Equation 317]}$$

Then, round trip time related information $l_k$ that is the most recently obtained is updated as [Equation 318] below.

$$l_k = \max\{l_k, nu_{1,k}\}, \text{ and} \quad \text{[Equation 318]}$$

In addition, when the availability value $u_{1,k}$ of obtaining the round trip time is 1, a round trip time $\delta_{k,n}$ of the k-th node in the n-th cycle is calculated, and the round trip time related information $\alpha_k$ that is the most recently obtained is updated as [Equation 319] below.

$$\delta_{k,n} = t_{k,n} - (t_{0,n} + D_{b,n} + w_{k,n}),$$

$$\alpha_k = \delta_{k,n} \quad \text{[Equation 319]}$$

[Step S3140]

The sink node increases n by 1, and step S3020 is performed to calculate $W_{k,n+1}$ for an (n+1)-th cycle.

According to the third embodiment of the present invention, in the method of scheduling for the underwater wireless mobile network, the sink node performs an initial stage; the sink node determines a receiving order of a data packet, and sets a time delay $w_{1,n}$ assigned to the first node in the n-th cycle to 0; the sink node estimates a round trip time $\hat{\delta}_{1,n}$ of the first node in the n-th cycle, and calculates a data packet receiving completion time $e_1$ of the first node; the sink node determines whether or not a parameter (k) is smaller than the last-th (K-th); if so, the sink node sets the parameter (k) to k+1; the sink node estimates a round trip time $\hat{\delta}_{k,n}$ of the k-th node in the n-th cycle; the sink node calculates an estimated value $p_k$ of a time at which the sink node starts receiving a data packet of the k-th node by using the estimated round trip time $\hat{\delta}_{k,n}$ of the k-th node when the k-th node transmits a data packet as soon as a beacon packet is received; the sink node calculates a latency $W_{k,n}$ of the k-th node by using the calculated estimated value $p_k$ of a time at which the sink node starts receiving a data packet of the k-th node; the sink node calculates an estimated value $e_k$ of a time at which receiving of a data packet of the k-th node is completed by using and the calculated estimated value $p_k$ of a time at which the sink node starts receiving a data packet of the k-th node and the calculated latency $W_{k,n}$ of the k-th node, and performs a determination step.

In other words, under a network environment where a round trip time is long and a transmission velocity of a physical layer is slow as in an underwater sound wireless mobile network, etc., network efficiency according to channel usage efficiency may be improved. In addition, time synchronization is not required, and thus the method finds application in the field in which time synchronization is not available or many resources are consumed for time synchronization. Further, an error is not accumulated and periodic re-initialization is not required. Particularly, when a number of nodes increases, network efficiency increases more. In the underwater network scheduling method using a polynomial equation interpolation method according to the present invention, information corresponding to a time difference is used rather than an absolute time basis, and thus the method is accurately operated even though local time information of each node is different. Accordingly, time synchronization is not required, and thus the method finds application in the field in which time synchronization is not available and many resources are consumed for time synchronization In addition, since an accurate value of round trip time information is obtained in each cycle, an error is not accumulated and periodic re-initialization is not required.

As described above, the optimum embodiments have been disclosed in the drawings and the specification. Although the specific terms have been used herein, they have been used merely for the purpose of describing the present invention, and have not been used to limit the meanings thereof and the scope of the present invention set forth in the claims. Therefore, it will be understood by those having ordinary knowledge in the art that various modifications and other equivalent embodiments can be made. As a result, the technical range of the protections of the present invention should be defined by the technical spirit of the attached claims.

The invention claimed is:

1. A method of scheduling for an underwater mobile network, wherein the method is performed for a network topology configured with one sink node and multiple nodes, the method comprising:

a first step of broadcasting, by the sink node, an initial packet to the multiple nodes;

a second step of receiving, by the sink node, an initial response packet from the multiple nodes for a first set time ($T_{init}$);

a third step of calculating, by the sink node, a round trip time ($RTT_H$) between the sink node and the multiple nodes from the initial response packet received in the second step;

a fourth step of determining, by the sink node, whether or not a collision occurs when receiving the initial response packet;

a fifth step of sorting, by the sink node, the nodes in ascending order of the round trip time by using round trip times ($RTT_H$) calculated in the third step when a collision does not occur when receiving the initial response packet in the fourth step;

a sixth step of setting, by the sink node, a parameter (k) to 1, and a latency ($w_{1,1}$) of a first node to "0";

a seventh step of calculating, by sink node, a maximum time value ($t_{1,1}^{max}$) at which the sink node starts receiving a data packet of the first node;

an eighth step of determining whether or not the parameter (k) is smaller than a last-th (K-th) parameter;

a ninth step of setting the parameter (k) to k+1 when the parameter (k) is determined to be smaller than the last-th (K-th) parameter in the eighth step;

a tenth step of calculating, by sink node, a minimum time value ($t_{k,1}^{min}$) at which the sink node receives a data packet of a k-th node;

an 11-th step of calculating, by the sink node, a latency ($w_{k,1}$) of the k-th node;

a 12-th step of calculating, by the sink node, a maximum time value ($t_{k,1}^{max}$) at which the sink node receives a data packet of the k-th node, and performing the eighth step;

a 13-th step of broadcasting, by the sink node, to the multiple nodes a first beacon packet for a third set time ($t_{0,1}$) when the parameter (k) is determined not to be smaller than the last-th (K-th) parameter in the eighth step;

a 14-th step of receiving, by the sink node, a data packet of the last-th (K-th) node or waiting for a fourth set time ($t_{K,1}^{max}+D_{K,1}$) after broadcasting the first beacon packet in the 13-th step;

a 15-th step of calculating, by the sink node, a round trip time ($\delta_{k,n}$) between the sink node and the k-th node;

a 16-th step of sorting, by the sink node, the nodes in ascending order of round trip time by using round trip times ($\delta_{k,n}$) calculated in the 15-th step;

a 17-th step of calculating, by the sink node, a round trip time variation ($\lambda_{max}$) of the node in which the round trip time varies in one cycle;

a 18-th step of setting the parameter (k) to 1, setting, by the sink node, a time delay ($W_{1,n}$) assigned to the first node in an n-th cycle to "0", and calculating a maximum time value ($t_{1,n}^{max}$) at which receiving of a data packet of the first node in the n-th cycle starts;

a 19-th step of determining whether or not the parameter (k) is smaller than the last-th (K-th) parameter;

a 20-th step of setting the parameter (k) to k+1 when the parameter (k) is determined to be smaller than the last-th (K-th) parameter in the 19-th step;

a 21-th step of calculating, by the sink node, a minimum time value ($t_{k,n}^{min}$) at which receiving of a data packet of the k-th node in the n-th cycle starts;

a 22-th step of calculating, by the sink node, a time delay ($W_{k,n}$) assigned to the k-th node in the n-th cycle;

a 23-th step of calculating, by the sink node, a maximum time value ($t_{k,n}^{max}$) at which receiving of a data packet of the k-th node in the n-th cycle starts, and performing the 19-th step;

a 24-th step of determining, by the sink node, whether or not to broadcast a beacon packet when the parameter (k) is determined not to be smaller than the last-th (K-th) parameter in the 19-th step; and a 25-th step of ending the scheduling method when the beacon packet is not broadcasted in the 24-th step.

2. The method of claim 1, wherein when a collision occurs when receiving the initial response packet in the fourth step, the method further performs:

a 29-th step of broadcasting, by the sink node, to the nodes a re-initial packet;

a 30-th step of receiving, by the sink node, a re-initial response packet for a second set time ($T_{reinit}$);

a 31-th step of calculating, by the sink node, a round trip time ($RTT_H$) between the sink node and the nodes from the re-initial response packet received in the 30-th step; and a 32-th step of determining, by the sink node, whether or not a collision occurs when receiving the re-initial response packet, wherein when a collision occurs when receiving the re-initial response packet in the 32-th step, the 29-th step is performed.

3. The method of claim 1, wherein the minimum time value ($t_{k,n}^{min}$) at which sink node starts receiving the data packet of the k-th node in the n-th cycle is calculated as Equation 119 below, $$t_{k,n}^{min} = \delta_{k,n-1} - \lambda_{max} \quad \text{[Equation 119]}$$

[wherein, $\delta_{k,n-1}$ is a round trip time of the k-th node in the (n−1)-th cycle].

4. The method of claim 1, wherein the time delay ($W_{k,n}$) assigned by the sink node to the k-th node in the n-th cycle is calculated as Equation 120 below, $$w_{k,n} = \max\{0, t_{k-1,n}^{max} - t_{k,n}^{min}\} \quad \text{[Equation 120]}$$

[wherein, $t_{k-1,n}^{max}$ is a maximum time value at which receiving of a data packet of a (k−1)-th node in the n-th cycle starts].

5. The method of claim 1, wherein the maximum time value ($t_{k,n}^{max}$) at which the sink node starts receiving the data packet of the k-th node in the n-th cycle is calculated as Equation 121 below, $$t_{k,n}^{max} = \delta_{k,n-1} + \lambda_{max} + w_{k,n} + D_{k,n} \quad \text{[Equation 121]}$$

[$D_{k,n}$ is a value obtained by converting a length of a data packet of the k-th node in the n-th cycle to a time].

6. A method of scheduling for an underwater wireless mobile network, wherein the method is performed for a network topology using a timed division multiple access method and configured with one sink node broadcasting a beacon packet including a transmission schedule, and multiple nodes transmitting to the sink node a data packet according to a transmission schedule by receiving the beacon packet of the sink node, the method comprising:

a first step of performing, by the sink node, an initial stage;

a second step of setting, by the sink node, a receiving order of a data packet receive, and setting a time delay ($w_{1,n}$) assigned to a first node in an n-th cycle to 0;

a third step of estimating, by the sink node, a round trip time ($\hat{\delta}_{1,n}$) of the first node in the n-th cycle, and calculating a data packet receiving completion time ($e_1$) of the first node;

a fourth step of determining, by the sink node, whether or not a parameter (k) is smaller than a last-th (K-th) parameter;

a fifth step of setting, by the sink node, the parameter (k) to k+1 when the parameter (k) is determined to be smaller than the last-th (K-th) parameter in the fourth step;

a sixth step of estimating, by the sink node, a round trip time ($\hat{\delta}_{k,n}$) of a k-th node in the n-th cycle;

a seventh step of calculating, by the sink node, an estimated time value ($p_k$) at which the sink node starts receiving a data packet of the k-th node by using the round trip time ($\hat{\delta}_{k,n}$) of the k-th node estimated in the sixth step when the k-th node transmits the data packet as soon as the beacon packet is received;

an eighth step of calculating, by the sink node, a latency ($W_{k,n}$) of the k-th node by using the calculated estimated time value ($p_k$) at which the sink node starts receiving the data packet of the k-th node; and a ninth step of calculating, by the sink node, an estimated time value ($e_k$) at which receiving of the data packet of the k-th node is completed by using the estimated time value ($p_k$) at which the sink node starts receiving the data packet of the k-th node and which is calculated in the seventh step, and the latency ($W_{k,n}$) of the k-th node which is calculated in the eighth step, and performing the fourth step.

7. The method of claim 6, wherein when the beacon packet is broadcasted in the tenth step, the method further includes:

a 11-th step of broadcasting, by the sink node, the beacon packet at a time ($t_{0,n}$) at which the sink node starts broadcasting the beacon packet in the n-th cycle;

a 12-th step of receiving a data packet of a K-th node or waiting until the estimated time value ($e_k$) at which receiving of the data packet of the K-th node is completed exceeds;

a 13-th step of calculating, by the sink node, a round trip time ($\hat{\delta}_{k,n}$) of a k-th node in the n-th cycle, and updating availability values ($u_{1,k}$ and $u_{2,k}$) of obtaining the round trip time, and round trip time related information ($\alpha_k$, $l_k$) which is the most recently obtained; and a 14-th step of increasing, by the sink node, n by 1, and performing the second step.

8. The method of claim 6, wherein in the third step, when a round trip time of the first node is successfully obtained in recent two cycles, the round trip time ($\hat{\delta}_{1,n}$) of the first node in the n-th cycle is estimated and the data packet receiving completion time ($e_1$) of the first node is calculated as [Equation 203] below, $$\hat{\delta}_{1,n} = \frac{1}{1 - X_{1,n}}(\delta_{1,n-1} + X_{1,n}(t_{0,n} + D_{b,n} - t_{1,n-1})) \quad \text{[Equation 203]}$$

$$e_1 = t_{0,n} + D_{b,n} + \hat{\delta}_{1,n} + \tau_g$$

[wherein, $\tau_g$ is a guard time, $\delta_{1,n-1}$ is a round trip time of the first node obtained in an (n−1)-th cycle, $D_{b,n}$ is a value obtained by converting a length of a beacon packet in the n-th cycle to a time, $t_{1,n-1}$ is a time at which the sink node starts receiving the data packet of the first node in the (n−1)-th cycle, and $X_{1,n}$ is as Equation 204 below]

$$X_{1,n} = \frac{\delta_{1,n-1} - \delta_{1,n-2}}{t_{1,n-1} - t_{1,n-2}} \quad \text{[Equation 204]}$$

[wherein, $\delta_{1,n-2}$ is a round trip time of the first node obtained in the (n−2)-th cycle, and $t_{1,n-2}$ is a time at which the sink node starts receiving a data packet of the first node in the (n−2)-th cycle].

9. The method of claim 6, wherein in the sixth step, when the round trip time of the k-th node is successfully obtain in recent two cycles, the round trip time ($\hat{\delta}_{k,n}$) of the k-th node in the n-th cycle is estimated as [Equation 207] below, $$\hat{\delta}_{k,n} = \delta_{k,n-1} + X_{k,n}(e_{k-1} - t_{k,n-1}) \quad \text{[Equation 207]}$$

[wherein, $\delta_{k,n-1}$ is a round trip time of the k-th node obtained in the (n−1)-th cycle, $e_{k-1}$ is an estimated time value at which the sink node completes receiving the data packet of the (k−1)-th node, $t_{k,n-1}$ is a time at which the sink node starts receiving a data packet of the k-th node in the (n−1)-th cycle, and $X_{k,n}$ is as Equation 211 below]

$$X_{k,n} = \frac{\delta_{k,n-1} - \delta_{k,n-2}}{t_{k,n-1} - t_{k,n-2}} \quad \text{[Equation 211]}$$

[wherein, $\delta_{k,n-2}$ is a round trip time of the k-th node obtained in an (n−2)-th cycle, and $t_{k,n-2}$ is a time at which the sink node starts receiving a data packet of the k-th node in the (n−2)-th cycle].

10. The method of claim 9, wherein the estimated time value ($p_k$) at which the sink node starts receiving the data packet of the k-th node when the k-th node transmits the data packet with the round trip time ($\hat{\delta}_{k,n}$) as soon as the beacon packet is received is calculated as [Equation 208] below, wherein, when $p_k > e_{k-1}$, the round trip time of the k-th node is estimated as [Equation 210] below by solving [Equation 209] below, and $X_{k,n}$ in the [Equation 210] is as [Equation 211] below, $$p_k = t_{0,n} + D_{b,n} + \hat{\delta}_{k,n}, \quad \text{[Equation 208]}$$

$$\hat{\delta}_{k,n} = \delta_{k,n-1} + X_{k,n}(\hat{t}_{k,n} - t_{k,n-1})$$

$$\hat{t}_{k,n} = t_{0,n} + D_{b,n} + \hat{\delta}_{k,n}, \text{ and} \qquad \text{[Equation 209]}$$

$$\hat{\delta}_{k,n} = \frac{1}{1-X_{k,n}}(\delta_{k,n-1} + X_{k,n}(t_{0,n} + D_{b,n} - t_{k,n-1})). \qquad \text{[Equation 210]}$$

11. The method of claim 6, wherein in the sixth step, when a round trip time of the k-th node is not successfully obtained in recent two cycles for at least one time, the round trip time ($\hat{\delta}_{k,n}$) of the k-th node in the n-th cycle is estimated as [Equation 212] below, $$\hat{\delta}_{k,n} = \max\{0, \alpha_k - 2v_{max}C_{n-1}(n-l_k)/c_{min}\} \qquad \text{[Equation 212]}$$

[wherein, $l_k$ is a cycle in which $\alpha_k$ is obtained].

12. The method of claim 6, wherein in the seventh step, the estimated time value ($p_k$) at which the sink node starts receiving the data packet of the k-th node is calculated as [Equation 213] below, $$p_k = t_{0,n} + D_{b,n} + \hat{\delta}_{k,n}. \qquad \text{[Equation 213]}$$

13. The method of claim 6, wherein in the eighth step, the latency ($W_{k,n}$) of the k-th node is calculated as [Equation 214] below, $$w_{k,n} = \max\{0, e_{k-1} - p_k\}. \qquad \text{[Equation 214]}$$

14. The method of claim 6, wherein in the ninth step, when a round trip time of the k-th node is successfully obtained in recent two cycles, the estimated time value ($e_k$) at which the sink node completes receiving the data packet of the k-th node is calculated as [Equation 215] below, $$e_k = p_k + D_{k,n} + w_{k,n} + \tau_g \qquad \text{[Equation 215]}$$

[wherein, $D_{k,n}$ is a value obtained by converting a length of a data packet of the k-th node in the n-th cycle to a time].

15. The method of claim 6, wherein in the ninth step, when a round trip time of the k-th node is not successfully obtained in recent two cycles for at least one time, the estimated time value ($e_k$) at which the sink node completes receiving the data packet of the k-th node is calculated as [Equation 216] below, $$e_k = t_{0,n} + D_{b,n} + w_{k,n} + \min\{\delta_{max}, \alpha_k + 2v_{max}C_{n-1}(n-l_k)/c_{min}\} + D_{k,n} \qquad \text{[Equation 216]}$$

16. A method of scheduling for a underwater wireless mobile network, wherein the method is performed for a network topology using a time division multiple access method and configured with one sink node broadcasting a beacon packet including a transmission schedule, and multiple nodes transmitting to the sink node a data packet according to a transmission schedule by receiving the beacon packet of the sink node, the method comprising:

a first step of performing, by the sink node, an initial stage;

a second step of determining, by the sink node, a receiving order of a data packet, and setting a time delay ($w_{1,n}$) assigned to a first node in an n-th cycle to 0;

a third step of estimating, by the sink node, a round trip time ($\hat{\delta}_{1,n}$) of the first node in the n-th cycle, and calculating a data packet receiving completion time ($e_1$) of the first node;

a fourth step of determining, by the sink node, whether or not a parameter (k) is smaller than a last-th (K-th) parameter;

a fifth step of setting, by the sink node, the parameter (k) to k+1 when the parameter (k) is determined to be smaller than the last-th (K-th) parameter in the fourth step;

a sixth step of estimating, by the sink node, a round trip time ($\hat{\delta}_{k,n}$) of a k-th node in the n-th cycle;

a seventh step of calculating, by the sink node, an estimated time value ($p_k$) at which the sink node starts receiving a data packet of the k-th node by using the round trip time ($\hat{\delta}_{k,n}$) of the k-th node estimated in the sixth step when the k-th node transmits the data packet as soon as the beacon packet is received;

an eighth step of calculating a latency ($W_{k,n}$) of the k-th node by using the estimated time value ($p_k$) at which the sink node starts receiving the data packet of the k-th node and which is calculated in the seventh step; and a ninth step of calculating, by the sink node, an estimated time value ($e_k$) at which receiving of the data packet of the k-th node is completed by using the estimated time value ($p_k$) at which the sink node starts receiving the data packet of the k-th node and which is calculated in the seventh step, and the latency ($W_{k,n}$) of the k-th node calculated in the eighth step, and of performing the fourth step.

17. The method of claim 16, wherein when the beacon packet is broadcasted in the tenth step, the method further includes:

a 11-th step of broadcasting, by the sink node, the beacon packet at a time ($t_{0,n}$) at which the sink node starts broadcasting a beacon packet in the n-th cycle;

a 12-th step of completing receiving of a data packet of a K-th node or waiting until the estimated time value ($e_k$) at which receiving of the data packet of the K-th node is completed exceeds;

a 13-th step of calculating, by the sink node, a round trip time ($\hat{\delta}_{k,n}$) of the k-th node in the n-th cycle, and updating an availability value ($u_{m,k}$) of obtaining the round trip time, and round trip time related information ($\alpha_k, l_k$) which is the most recently obtained; and a 14-th step of increasing, by the sink node, n by 1, and performing the second step.

18. The method of claim 16, wherein in the sixth step, when a number of times that a round trip time of the k-th node is successfully obtained is equal to or greater than $J_0$ times during M recent cycles, the round trip time ($\hat{\delta}_{k,n}$) of the k-th node in the n-th cycle is estimated as [Equation 307] below, $$\hat{\delta}_{k,n} = Q_k(e_{k-1}) \qquad \text{[Equation 307]}$$

[wherein, $Q_k(x)$ is a polynomial equation of minimum order which passes coordinates of $$(t_{k,n-m_1}, \delta_{k,n-m_1}), \ldots, (t_{k,n-m_j}, \delta_{k,n-m_j}), \ldots, (t_{k,n-m_{J_k}}, \delta_{k,n-m_{J_k}});$$

$$\delta_{k,n-m_j}$$

is a valid value of round trip time of the k-th node in an $(n-m_j)$ cycle; and $e_{k-1}$ is an estimated value of a time at which the sink node completes receiving a data packet of a (k−1)-th node].

19. The method of claim 16, wherein in the sixth step, when $p_k > e_{k-1}$, the round trip time ($\hat{\delta}_{k,n}$) of the k-th node in the n-th cycle is estimated as [Equation 309] below, $$\hat{\delta}_{k,n} = Q_k(\hat{t}_{k,n})$$

$$\hat{t}_{k,n} = t_{0,n} + D_{b,n} + \hat{\delta}_{k,n}. \qquad \text{[Equation 309]}$$

20. The method of claim 16, wherein in the eighth step, the latency ($W_{k,n}$) of the k-th node is calculated as [Equation 312] below, $$w_{k,n} = \max\{0, e_{k-1} - p_k\}. \quad \text{[Equation 312]}.$$

\* \* \* \* \*